(12) United States Patent
von der Embse

(10) Patent No.: US 7,352,796 B1
(45) Date of Patent: Apr. 1, 2008

(54) MULTIPLE DATA RATE COMPLEX WALSH CODES FOR CDMA

(75) Inventor: Urbain Alfred von der Embse, P.O. Box 11690, Marina del Rey, CA (US) 90295

(73) Assignee: Urbain Alfred von der Embse, Westchester, CA (US)

( * ) Notice: Subject to any disclaimer, the term of this patent is extended or adjusted under 35 U.S.C. 154(b) by 751 days.

(21) Appl. No.: 09/846,410

(22) Filed: Feb. 13, 2001

(51) Int. Cl.
*H04B 1/00* (2006.01)
*H03D 1/00* (2006.01)

(52) U.S. Cl. ..................... 375/146; 375/147
(58) Field of Classification Search ........ 375/140–152, 375/343, 130, 316
See application file for complete search history.

(56) References Cited

U.S. PATENT DOCUMENTS

| | | | | |
|---|---|---|---|---|
| 5,311,176 A | * | 5/1994 | Gurney ........................ | 341/50 |
| 5,442,625 A | * | 8/1995 | Gitlin et al. ................. | 370/342 |
| 5,805,567 A | * | 9/1998 | Ramesh ....................... | 370/204 |
| 5,862,453 A | * | 1/1999 | Love et al. ................... | 455/69 |
| 5,943,361 A | * | 8/1999 | Gilhousen et al. ........... | 375/142 |
| 5,946,344 A | * | 8/1999 | Warren et al. ............... | 375/150 |
| 5,956,345 A | * | 9/1999 | Allpress et al. ............... | 370/480 |
| 6,088,347 A | * | 7/2000 | Minn et al. ................... | 370/342 |
| 6,157,611 A | * | 12/2000 | Shanbhag .................... | 370/208 |
| 6,167,079 A | * | 12/2000 | Kinnunen et al. ........... | 375/225 |
| 6,185,246 B1 | * | 2/2001 | Gilhousen .................... | 375/130 |
| 6,317,413 B1 | * | 11/2001 | Honkasalo ................... | 370/209 |
| 6,389,138 B1 | * | 5/2002 | Li et al. ....................... | 380/35 |
| 6,396,804 B2 | * | 5/2002 | Odenwalder ................ | 370/209 |
| 6,674,712 B1 | * | 1/2004 | Yang et al. .................. | 370/208 |
| 2002/0126741 A1 | * | 9/2002 | Baum et al. ................. | 375/144 |

* cited by examiner

*Primary Examiner*—Chieh M. Fan
*Assistant Examiner*—Jason M. Perilla

(57) ABSTRACT

A method and system using the fast encoding and decoding of hybrid Walsh CDMA and generalized hybrid Walsh CDMA codes for simultaneous transmission of multiple data rate users with the different data rate groups of users separated in the sequency domain of these complex CDMA channelization codes. Sequency is the average rate of phase angle rotations of the code vectors and for hybrid Walsh codes sequency is in a 1-to-1 correspondence with frequency for the discrete Fourier transform codes. Hybrid Walsh codes are derived from lexicographic permutations of the real Walsh and can take values $\{1, j, -1, -j\}$. Generalized hybrid Walsh codes are orthogonal and quasi-orthogonal complex codes derived from tensor (Kronecker) product construction, direct product construction, and functional combining of the plurality of codes including the hybrid Walsh and discrete Fourier transform codes.

5 Claims, 6 Drawing Sheets

CDMA Transmitter Block Diagram

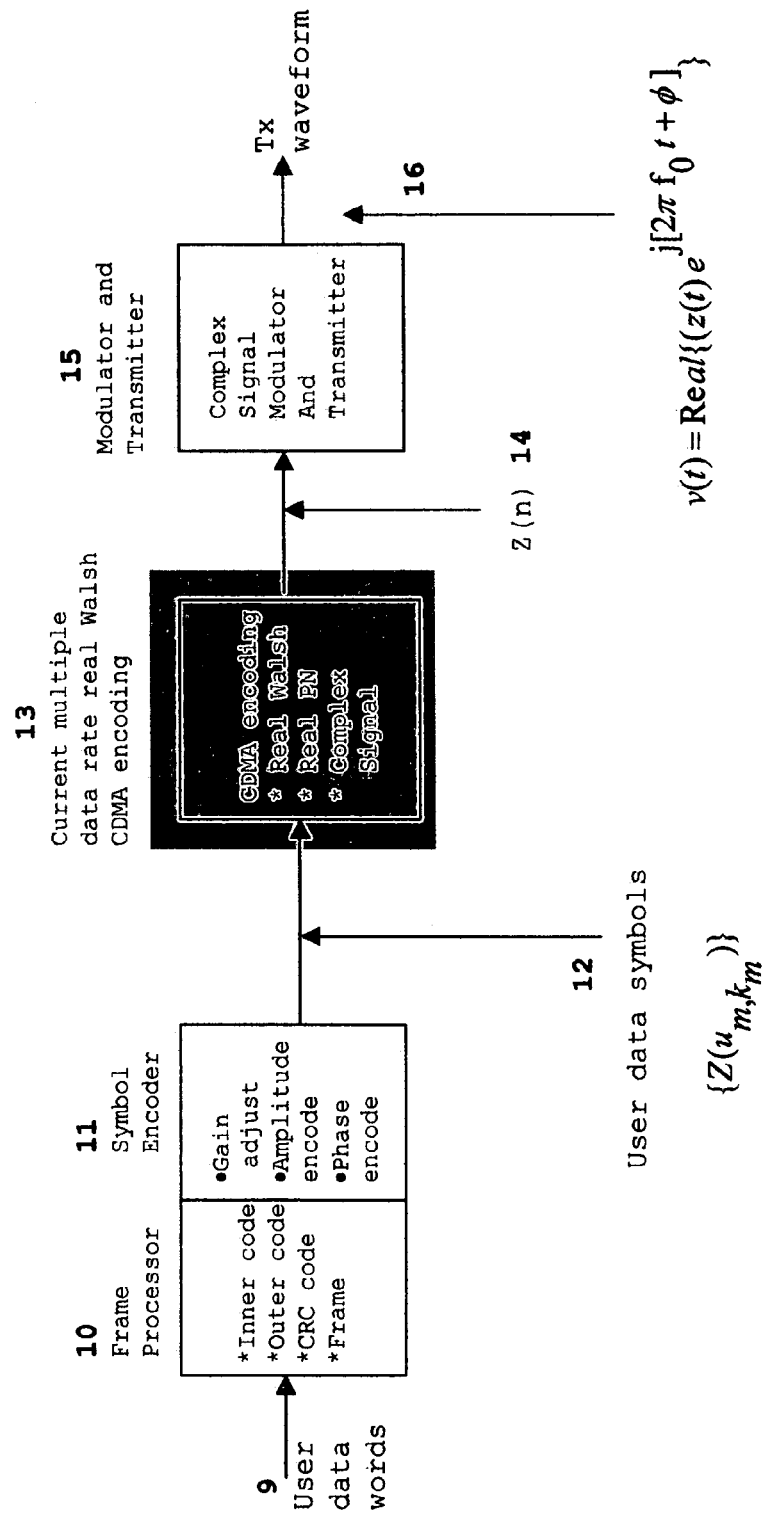
FIG. 1 CDMA Transmitter Block Diagram

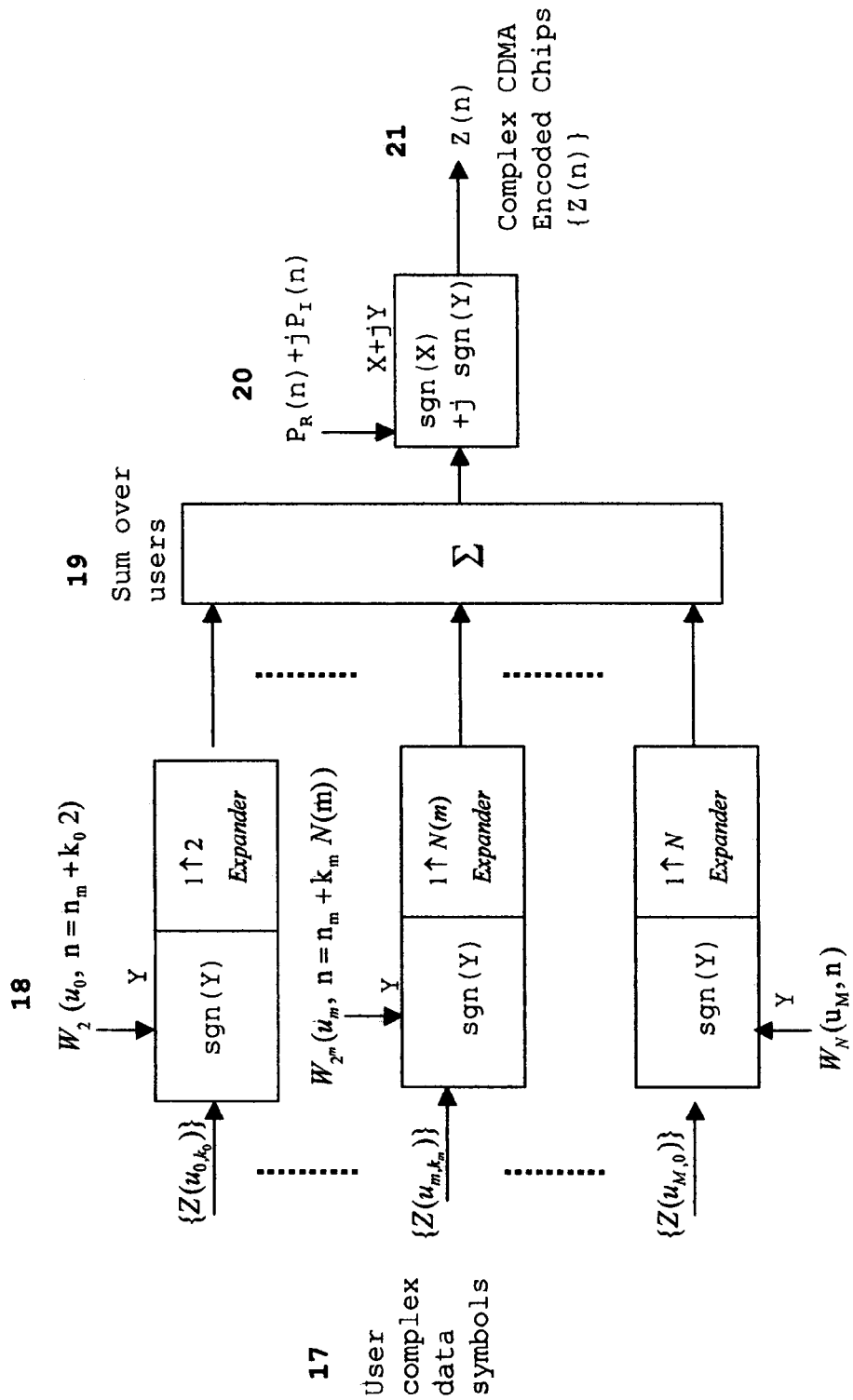
FIG. 2  Multiple Data Rate Real Walsh CDMA Encoding

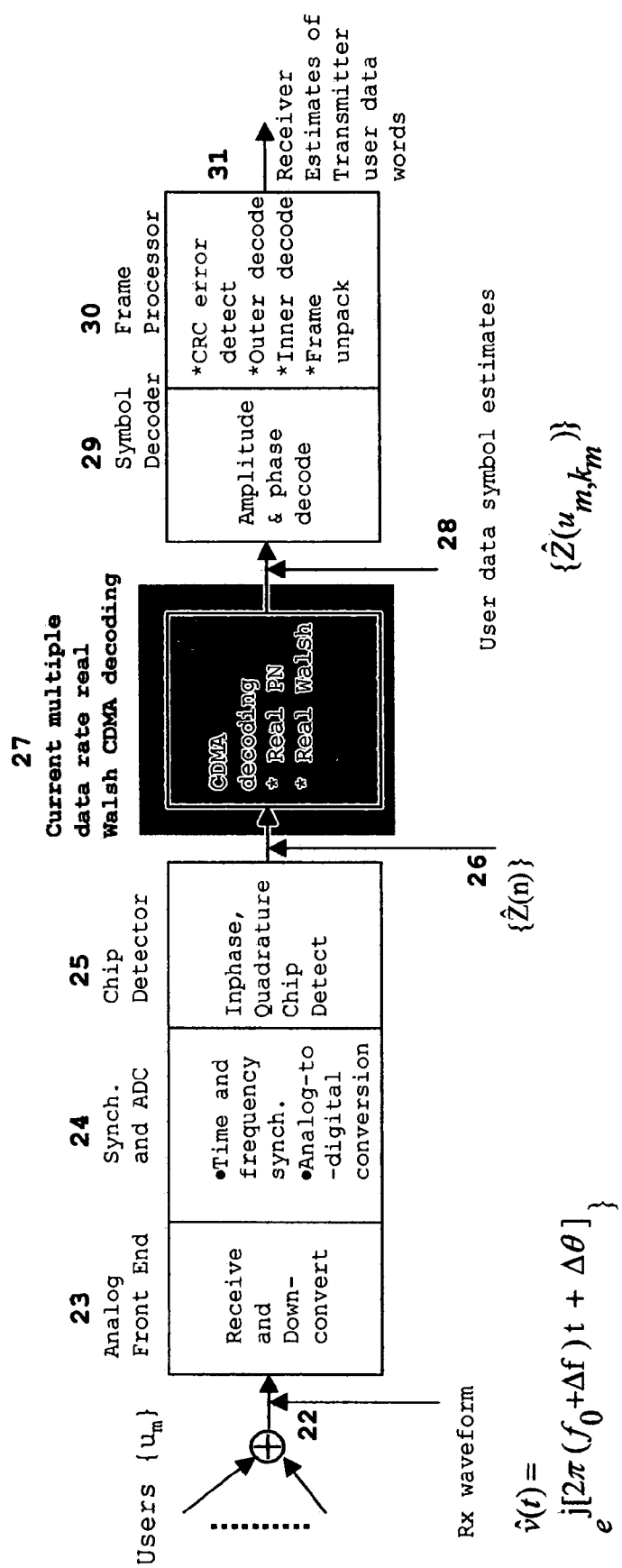
FIG. 3 CDMA Receiver Block Diagram

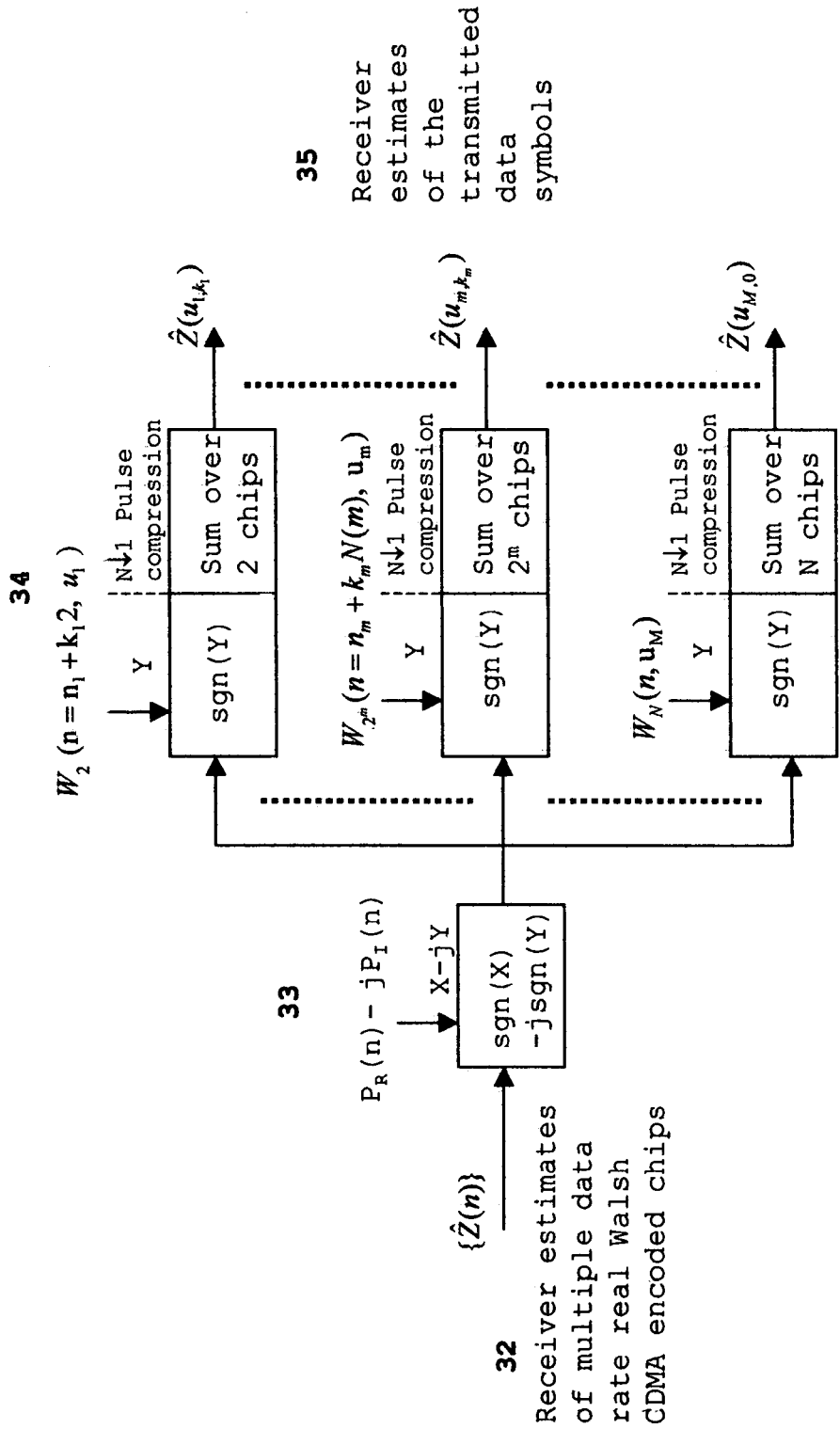
FIG. 4 Multiple Data Rate Real Walsh CDMA Decoding

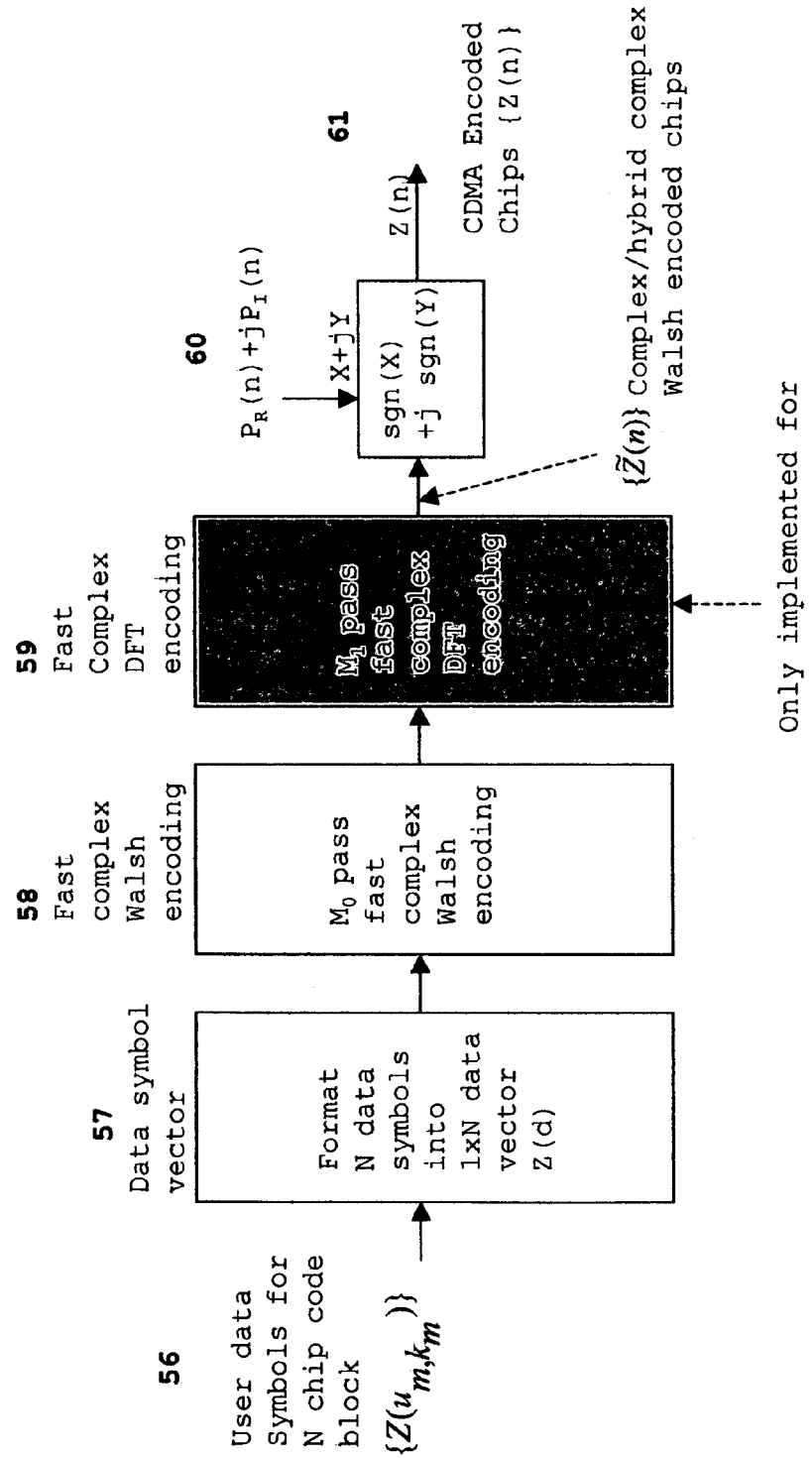
FIG. 5  Hybrid and Generalized Hybrid Walsh CDMA Encoding of Multiple Data Rate Users

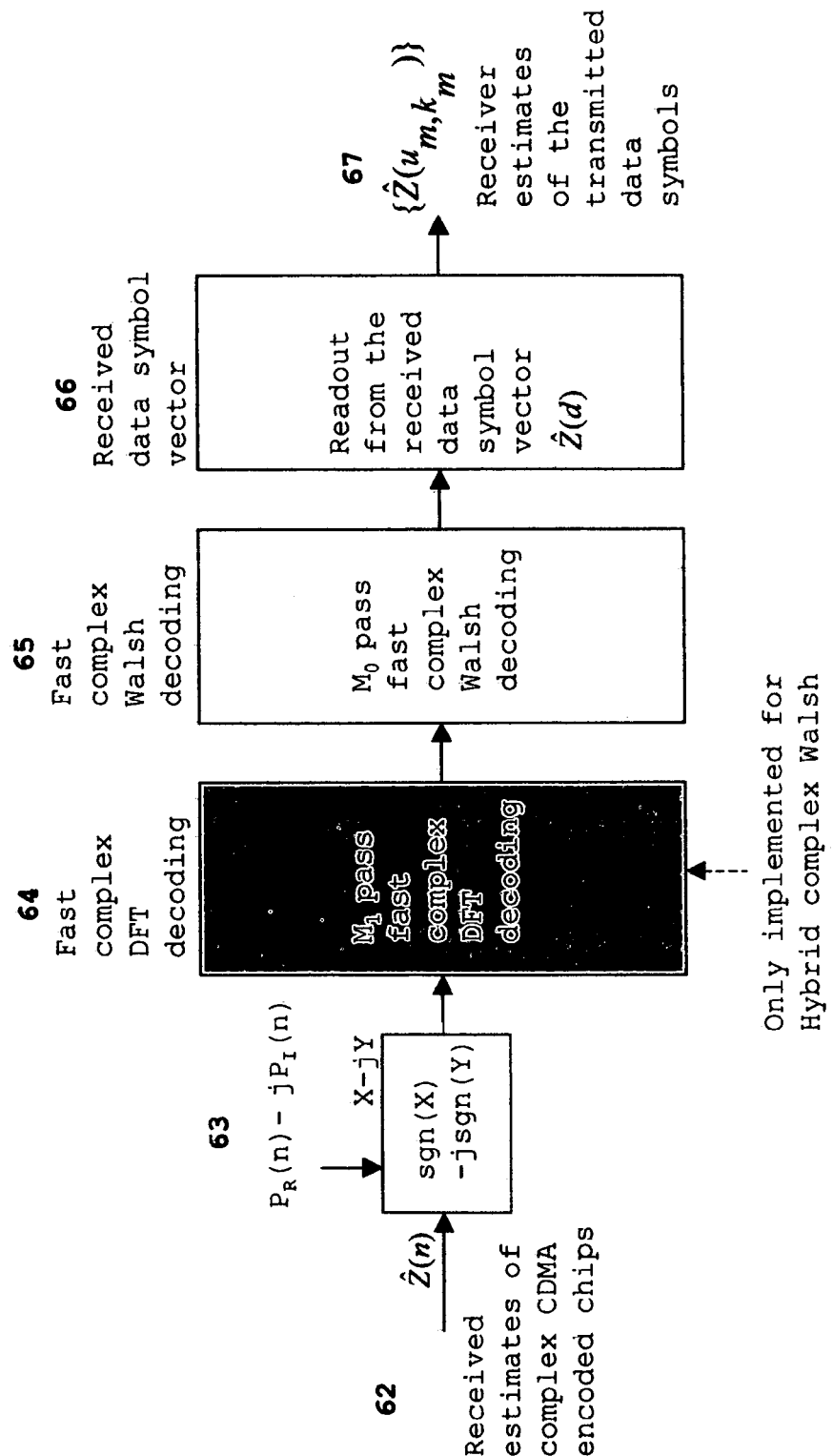
FIG. 6 Hybrid and Generalized Hybrid Walsh CDMA Decoding of Multiple Data Rate Users

MULTIPLE DATA RATE COMPLEX WALSH CODES FOR CDMA

BACKGROUND OF THE INVENTION

I. Field of the Invention

The present invention relates to CDMA (Code Division Multiple Access) cellular telephone and wireless data communications with data rates up to multiple T1 (1.544 Mbps) and higher (>100 Mbps), and to optical, CDMA with data rates in the Gbps and higher ranges. Applications are mobile, point-to-point and satellite communication networks. More specifically the present invention relates to novel multiple data rate algorithms for hybrid and generalized hybrid complex Walsh orthogonal CDMA codes for use as the channelization codes for multiple data rate users. These new algorithms and codes offer substantial improvements over the current real Walsh orthogonal variable spreading factor (OVSF) CDMA codes for the next generation wideband CDMA (W-CDMA).

II. Description of the Related Art

Current art is represented by the work on orthogonal spreading factor (OVSF) real Walsh codes for wideband CDMA (W-CDMA) for the third generation CDMA (G3) proposed standard candidates and for broadband wireless communications, and the previous work on the real Walsh fast transform algorithms. These are documented in the references which include an issue of the IEEE communications journal devoted to wideband CDMA including OVSF, issues of the IEEE communications magazine that are devoted to "Multiple Access for Broadband Networks" and "Wideband CDMA", an issue of the IEEE personal communications devoted to "Third Generation Mobile Systems in Europe", and the widely used reference "Walsh functions and their Applications" on real Walsh technology which includes algorithms for the fast Walsh transform. The new hybrid complex Walsh and generalized hybrid complex Walsh orthogonal CDMA codes being addressed in this invention for application to multiple data rate users, have been disclosed in a previous patent application Ser. No. 09/826,117 for constant data rate communications.

Current art using real Walsh orthogonal CDMA channelization codes to generate OVSF codes for multiple data rate users is represented by the scenario described in the following with the aid of equations (1) and (2) and FIGS. 1, 2, 3, 4. This scenario considers CDMA communications spread over a common frequency band for each of the communication channels. These CDMA communications channels for each of the multiple rate users are defined by assigning a unique real Walsh orthogonal spreading code to each user. This real Walsh code has a maximum length of N chips with $N=2^M$ where M is an integer, with shorter lengths of 2, 4, ..., N/2 for the higher data rate users. These multiple length real Walsh codes have limited orthogonality properties and occupy the same frequency band. These Walsh encoded user signals are summed and then re-spread over the same frequency band by PN codes, to generate the CDMA communications signal that is modulated and transmitted. The communications link consists of a transmitter, propagation path, and receiver, as well as interfaces and control.

It is assumed that the communication link is in the communications mode with the users communicating at symbol rates equal to the code repetition rates of their respective communications channels and that the synchronization is sufficiently accurate and robust to support this communications mode. In addition, the power differences between users due to differences in data rates and in communication link budget parameters is assumed to be incorporated in the data symbol amplitudes prior to the CDMA encoding in the CDMA transmitter, and the power is uniformly spread over the wideband by proper selection of the CDMA pulse waveform. It is self evident to anyone skilled in the CDMA communications art that these communications mode assumptions are both reasonable and representative of the current CDMA art and do not limit the applicability of this invention.

Transmitter equations (1) describe a representative real Walsh CDMA encoding for multiple data rate users for the transmitter in FIG. 1. These equations represent a considerably more sophisticated and improved implementation of current OVSF CDMA communications which has been developed to help support the new invention for hybrid complex Walsh and generalized hybrid complex Walsh CDMA orthogonal codes.

Lowest data rate users are assumed to communicate at the lowest symbol rate equal to the code repetition rate of the N chip real Walsh code, which means they are assigned N chip code vectors from the N×N real Walsh code matrix $W_N$ in 1 for their channelization codes. Higher data rate users will use shorter real Walsh codes. The reference real Walsh code matrix $W_N$ has N Walsh row code vectors $W_N(c)$ each of length N chips and indexed by c=0, 1, ..., N−1, with $W_N(c)=[W_N(c,1), \ldots, W_N(c,N)]$ wherein $W_N(c,n)$ is chip n of code u. Walsh code chip n of code vector u has the possible values $W_N(c,n)=+/-1$.

Multiple data rate menu in 2 lists the possible user data symbol rates $R_s$ and the corresponding code lengths and symbols transmitted over each N chip reference code length. User symbol rate $R_s=1/NT$ is the code repetition rate 1/NT of the N chip code over the code time interval NT. User data rate $R_b$ in bits/second is equal to $R_b=R_s b_s$ where $b_s$ is the number of data bits encoded in each data symbol. Assuming a constant $b_s$ for all of the multiple data rate users, the user data rate becomes directly proportional to the user symbol rate $R_b \sim R_s$ which means the user symbol rate menu in 1 is equivalent to the user data rate menu.

User data symbols and channelization codes are listed in 3 for the multiple rate users. Users are grouped into the data rate categories corresponding to their respective code chip lengths 2, 4, 8, ..., N/2, N chips. User groups are indexed by m=1, 2, ..., M where group m consists of all users with $N(m)=2^m$ chip length codes drawn from the N(m)×N(m) real Walsh code matrix $W_{N(m)}$. Users within group m are identified by the index $u_m$ which is set equal to the Walsh channelization code vector index in $W_{N(m)}$. Code chip $n_m$ of the user code $u_m$ is equal to $W_{N(m)}(u_m, n_m)$ where $n_m=0, 1, 2, \ldots, N(m)-1$ is the chip index. User data symbols $Z(u_{m,k_m})$ are indexed by $u_{m,k_m}$ where the index $k_m=0, 1, 2, \ldots, N/N(m)-1$ identifies the data symbols of $u_m$ which are transmitted over the N chip code block. The total number of user data symbols transmitted per N chip block is N which means the number of channel assignments $\{u_m, m=1, 2, \ldots, M\}$ will be less than N for multiple data rate CDMA communications when there is at least one user using a higher data rate.

Current multiple data rate real Walsh CDMA encoding (1) for transmitter

1 N chip Walsh code block $W_N$ = Walsh $N \times N$ orthogonal code matrix consisting of N rows of N chip code vectors = $[W_N(c)]$ matrix of row vectors $W_N(c)$ = $[W_N(c, n)]$ matrix of elements $W_N(c, n)$ $W_N(c)$ = Walsh code vector $c$ for $c = 0, 1, \ldots, N-1$ = $[W_N(c, 0), W_N(c, 1), \ldots, W_N(c, N-1)]$ = $1 \times N$ row vector of chips $W_N(c, 0), \ldots, W_N(c, N-1$ $W_N(c, n)$ = Walsh code $c$ chip $n$ = $+/+1$ possible values

2 Multiple data rate menu N chip real Walsh symbol rate

| $R_s$ | = | User symbol rate, symbols/second |
|---|---|---|
| | = | $1/NT$ where T = Chip repetition interval |

Symbol rate menu for multiple data rates

| Symbol rate, Symbols/second | | Code length, chips | Symbols per N chips |
|---|---|---|---|
| $R_s$ | = 1/2T | 2 | N/2 |
| | = 1/4T | 4 | N/4 |
| | = 1/8T | 8 | N/8 |
| | . | . | . |
| | . | . | . |
| | . | . | . |
| | = 1/2NT | N/2 | 2 |
| | = 1/NT | N | 1 |

3 User data symbols and channelization codes

Users are categorized into M groups according to the number of code chips.

$m$ = Index of the user groups

= $1, 2, \ldots, M$ $u_m$ = One of up to $N(m) = 2^m$ possible users in group $m$ $N(m)$ = Number of code chips for the codes in the user group $m$ = $2^{m+1}$ User data symbols $Z(u_{m,k_m})$ = User $u_m$ data symbol $k_m$ $k_m$ = Index for the user data symbols over the $N$ chip code block, for $a$ user from group $m$ = $0, 1, 2, \ldots, N/N(m) - 1$ User channelization codes within each group are selected from a subset of the orthogonal codes in the Walsh code matrix.

$W_{N(m)}(u_m)$ = Walsh $1 \times 2^m$ dimensional code vector $u_m$ in the $N(m) \times N(m)$ Walsh code matrix, for user $u_m$ in the group m $W_{N(m)}(u_m, n_m)$ = User $u_m$ code chip $n_m = 0, 1, 2, \ldots, N(m)-1$

4 Real Walsh encoding and channel combining $\tilde{Z}(n)$ = Real Walsh CDMA encoded chip $n$ $= \sum_{m=1}^{M} \sum_{u_m} Z(u_{m,k}) W_{N(m)}(u_m, n = n_m + k_m N(m))$

5 PN scrambling $P_R(n), P_I(n)$ = PN code chip $n$ for real, imaginary axes $Z(n)$ = PN scrambled real Walsh encoded data chips after summing over the users $= \sum_u \tilde{Z}(n)[P_R(n) + jP_I(n)]$ where $j = \sqrt{(-1)}$ $= \sum_u \tilde{Z}(n)[sgn\{P_R(n)\} + jsgn\{P_I(n)\}]$ = Real Walsh CDMA encoded complex chips after PN scrambling Walsh encoding and channel combining in 4 encodes each of the users $\{u_m\}$ and their data symbols $\{Z(u_{m,k_m})\}$ with a Walsh code $W_{N(m)}(u_m)$ drawn from the group m of the N(m) chip channelization codes where $u_m$ is the user code. A time delay of $k_m N(m)$ chips before start of the real Walsh encoding of the data symbol $k_m$ in each of the user channels, is required for implementation of the multiple data rate user real Walsh encoding and for the summation of the encoded data chips over the users. Output of this multiple data rate real Walsh encoding and summation over the multiple data rate users is the set of real Walsh CDMA encoded chips $\{\tilde{Z}(n)\}$ over the N chip block.

PN scrambling of the real Walsh CDMA encoded chips in 5 is accomplished by encoding the $\{\tilde{Z}(n)\}$ with a complex PN which is constructed as the complex code sequence $[P_R(n)+jP_I(n)]$ wherein $P_R(n)$ and $P_I(n)$ are independent PN sequences used for the real and imaginary axes of the complex PN. These PN codes are 2-phase with each chip equal to +/−1 which means PN encoding consists of sign changes with each sign change corresponding to the sign of the PN chip. Encoding with PN means each chip of the summed Walsh encoded data symbols has a sign change when the corresponding PN chip is −1, and remains unchanged for +1 values. This operation is described by a multiplication of each chip of the summed Walsh encoded data symbols with the sign of the PN chip. Purpose of the PN encoding for complex data symbols is to provide scrambling of the summed Walsh encoded data symbols as well as isolation between groups of users. Output of this real Walsh CDMA encoding followed by the complex PN scrambling are the CDMA encoded chips over the N chip block $\{Z(n)\}$.

Receiver equations (2) describe a representative multiple data rate real Walsh CDMA decoding for the receiver in FIG. 3. The receiver front end 5 provides estimates $\{\hat{Z}(n)\}$ of the transmitted real Walsh CDMA encoded chips $\{Z(n)\}$. Orthogonality property 6 is expressed as a matrix product of the real Walsh code chips or equivalently as a matrix product of the Walsh code chip numerical signs, for any of the 2, 4, 8, ..., N/2, N chip real Walsh channelization codes and their repetitions over the N chip code block. These codes are orthogonal with respect to the user codes within a group. They are also orthogonal between code groups for the allowable subsets of code assignments to the users, for all code repetitions over the N chip code block. This means that the allowable codes $\{u_m\}$ in group m are orthogonal to the allowable codes $\{u_{m+p}\}$ in group m+p for all code repetitions of the codes $\{u_m\}$ over the N chip code block, for $p \geq 0$.

The 2-phase PN codes 7 have the useful decoding property that the square of each code chip is unity which is equivalent to observing that the square of each code chip numerical sign is unity. Decoding algorithms 8 perform the inverse of the signal processing for the encoding in equations (1) to recover estimates $\{\hat{Z}(u_{m,k_m})\}$ of the transmitter user symbols $\{Z(u_{m,k_m})\}$ Current multiple data rate real Walsh CDMA decoding (2) for receiver 5 Receiver front end provides estimates $\{\hat{Z}(n) = \hat{R}(n)+j\hat{I}(n)\}$ of the encoded transmitter chip symbols $\{Z(n)\}$ 6 Orthogonality properties of the set of real Walsh $\{2 \times 2, 4 \times 4, 8 \times 8, \ldots N \times N\}$ matrices The $N(m) \times N(m)$ Walsh code matrices for all m are orthogonal $$N(m)^{-1} \sum_{n_m} W_{N(m)}(\hat{c}_m, n_m) W_{N(m)}(n_m, c_m) = \delta(\hat{c}_m, c_m)$$

where $c_m, n_m = 0, 1, \ldots, N(m)$ $\delta(\hat{c}_m, c_m)$ = Delta function of $\hat{c}_m$ and $c_m$
    = 1, 0 for $\hat{c}_m = c_m$, otherwise The $N(m) \times N(m)$ and $N(m+p) \times N(m+p)$ Walsh code matrices for all m and p>0 are orthogonal for a subset of codes $\{u_m\}$ and $\{u_{m+p}\}$ $$N(m)^{-1} \sum_{n_m} W_{N(m)}(u_m, n_m) \cdot W_{N(m+p)}(u_{m+p}, n_{m+p} = n_m + k_m N(m))$$

$= 0$ for $k_m = 0, 1, 2 \ldots, N/N(m) - 1$

7 PN decoding property $P(n)P(n) = sgn\{P(n)\}sgn\{P(n)\}$
    $= 1$

8 Decoding algorithm $$\hat{Z}(u_{m,k_m}) = (2N)^{-1} \sum_{n_m} \hat{Z}(n)[sgn\{P_R(n)\} - jsgn\{P_I(n)\}] \cdot$$

$sgn\{W_{N(m)}(n = n_m + k_m N(m), u_m)\}$

= Receiver estimate of the transmitted complex data symbol $Z(u_{m,k_m})$

FIG. 1 CDMA transmitter block diagram is representative of a current CDMA transmitter that includes an implementation of the current multiple data rate real Walsh CDMA channelization encoding in equations (1). This block diagram becomes a representative implementation of the CDMA transmitter which implements the multiple data rate hybrid Walsh and generalized hybrid Walsh CDMA encoding, when the current multiple data rate real Walsh CDMA encoding 13 is replaced by the new multiple data rate hybrid Walsh and generalized hybrid Walsh CDMA encoding of this invention.

Signal processing starts with the stream of user input data words 9. Frame processor 10 accepts these data words and performs the encoding and frame formatting, and passes the outputs to the symbol encoder 11 which encodes the frame symbols into amplitude and phase coded symbols $\{Z(u_{m,k})\}$ 12. These symbols 12 are the inputs to the current multiple data rate real Walsh CDMA encoding in equations (1). Inputs $\{Z(u_{m,k})\}$ 12 are real Walsh encoded, summed over the users, and scrambled by complex PN in the current multiple date rate real Walsh CDMA encoder 13 to generate the complex output chips $\{Z(n)\}$ 14. This encoding 13 is a representative implementation of equations (1). These output chips Z(n) are waveform modulated 15 to generate the analog complex signal z(t) which is single sideband upconverted, amplified, and transmitted (Tx) by the analog front end of the transmitter 15 as the real waveform v(t) 16 at the carrier frequency $f_0$ whose amplitude is the real part of the complex envelope of the baseband waveform z(t) multiplied by the carrier frequency and the phase angle $\phi$ which accounts for the phase change from the baseband signal to the transmitted signal.

It should be obvious to anyone skilled in the communications art that this example implementation in FIG. 1 clearly defines the fundamental CDMA signal processing relevant to this invention disclosure and it is obvious that this example is representative of the other possible signal processing approaches.

FIG. 2 multiple data rate real Walsh CDMA encoding is a representative implementation of the multiple data rate real Walsh CDMA encoding 13 in FIG. 1 and in equations (1). Inputs are the complex user data symbols $\{Z(u)\}$ 17. Encoding of each user by the corresponding Walsh code is described in 18 by the implementation of transferring the sign of each Walsh code chip to the user data symbol followed by a 1-to-N expander $1 \uparrow N$ of each data symbol into an N chip sequence using the sign transfer of the Walsh chips. The sign-expander operation 18 generates the N-chip sequence $Z(u_{m,k_m})sgn\{W(u_m, (n=n_m+k_mN(m))\}$ for n=0, 1, ..., N-1 for each user $\{u_m\}$. This Walsh encoding serves to spread each user data symbol into an orthogonally encoded chip sequence which is spread over the CDMA communications frequency band. The Walsh encoded chip sequences for each of the user data symbols are summed over the users 19 followed by PN encoding with the scrambling sequence $[P_R(n)+jP_I(n)]$ 20. PN encoding is implemented by transferring the sign of each PN chip to the summed chip of the Walsh encoded data symbols. Output is the stream of complex multiple data rate real Walsh CDMA encoded chips $\{Z(n)\}$ 21.

It should be obvious to anyone skilled in the communications art that this example implementation in FIG. 2 clearly defines the fundamental CDMA signal processing relevant to this invention disclosure and it is obvious that this example is representative of the other possible signal processing approaches.

FIG. 3 CDMA receiver block diagram is representative of a current CDMA receiver which includes an implementation of the current multiple data rate real Walsh CDMA decoding in equations (2). This block diagram becomes a representative implementation of the CDMA receiver which implements the multiple data rate hybrid complex Walsh and generalized hybrid complex Walsh CDMA decoding when the current multiple data rate real Walsh CDMA decoding 27 is replaced by the multiple data rate hybrid complex Walsh and generalized hybrid complex Walsh CDMA decoding of this invention.

FIG. 3 signal processing starts with the user transmitted wavefronts incident at the receiver antenna 22 for the users $\{u_m\}$. These wavefronts are combined by addition in the antenna to form the receive (Rx) signal $\hat{v}(t)$ at the antenna output 22 where $\hat{v}(t)$ is an estimate of the transmitted signal v(t) 16 in FIG. 1, that is received with errors in time $\Delta t$, frequency $\Delta f$, phase $\Delta\theta$, and with an estimate $\hat{z}(t)$ of the transmitted complex baseband signal z(t) 16 in FIG. 1. This received signal $\hat{v}(t)$ is amplified and downconverted by the analog front end 23 and then synchronized and analog-to-digital (ADC) converted 24. Outputs from the ADC are filtered and chip detected 25 by the fullband chip detector, to recover estimates $\{\hat{Z}(n)\}$ 26 of the transmitted signal which is the stream of complex CDMA encoded chips $\{Z(n)\}$ 14 in FIG. 1. CDMA decoder 27 implements the algorithms in equations (2) by stripping off the PN code(s) and decoding the received CDMA real Walsh orthogonally encoded chips to recover estimates $\{\hat{Z}(u_{m,k_m})\}$ 28 of the transmitted user data symbols $\{Z(u_{m,k_m})\}$ 12 in FIG. 1. These estimates 28 are processed by the symbol decoder 29 and the frame processor 30 to recover estimates 31 of the transmitted user data words.

It should be obvious to anyone skilled in the communications art that this example implementation clearly defines the fundamental current CDMA signal processing relevant to this invention disclosure and it is obvious that this example is representative of the other possible signal processing approaches.

FIG. 4 multiple data rate real Walsh CDMA decoding is a representative implementation of the multiple data rate real Walsh CDMA decoding 27 in FIG. 3 and in equations (2). Inputs are the received estimates of the multiple data rate complex real Walsh CDMA encoded chips $\{\hat{Z}(n)\}$ 32. The PN scrambling code is stripped off from these chips 33 by changing the sign of each chip according to the numerical sign of the real and imaginary components of the complex conjugate of the PN code as per the decoding algorithms 8 in equations (2). Real Walsh channelization coding is removed in 34 by a pulse compression operation consisting of multiplying each received chip by the numerical sign of the corresponding Walsh chip for the user and summing the products over the N Walsh chips to recover estimates $\{\hat{Z}(u_{m,k_m})\}$ 35 of the user complex data symbols $\{Z(u_{m,k_m})\}$ after renormalization by the divisor 2N not depicted in the drawing.

It should be obvious to anyone skilled in the communications art that this example implementation clearly defines the fundamental current CDMA signal processing relevant to this invention disclosure and it is obvious that this example is representative of the other possible signal processing approaches.

For cellular applications the transmitter description describes the transmission signal processing applicable to this invention for both the hub and user terminals, and the receiver describes the corresponding receiving signal processing for the hub and user terminals for applicability to this invention.

For optical communications applications the microwave processing at the front end of both the transmitter and the receiver is replaced by the optical processing which performs the complex modulation for the optical laser transmission in the transmitter and which performs the optical laser receiving function of the microwave processing to recover the complex baseband received signal.

SUMMARY OF THE INVENTION

This invention discloses fast and computationally efficient algorithms for multiple data rate orthogonal channelization encoding and decoding for CDMA using the hybrid complex Walsh codes and the generalized hybrid complex Walsh orthogonal and quasi-orthogonal codes in place of the current real Walsh orthogonal codes. Real Walsh codes are used for current CDMA applications and will be used for all of the future CDMA systems. The hybrid complex Walsh codes disclosed in Ser. No. 09/826,117 provide the choice of using the hybrid complex Walsh codes or the real Walsh codes since the real Walsh codes are the real components of the hybrid complex Walsh codes. This means an application capable of using the hybrid complex Walsh codes can simply turn-off the complex axis components of the hybrid complex Walsh codes for real Walsh CDMA coding and decoding.

Performance is improved for the multiple data rate CDMA communications when the hybrid 4-phase complex Walsh orthogonal CDMA codes replace the current 2-phase real Walsh codes.

Greater flexibility in performance improvement and code length choices for multiple data rate CDMA communications are available with the generalized hybrid complex Walsh orthogonal and quasi-orthogonal CDMA codes which are generated by combining hybrid complex Walsh and discrete Fourier transform complex orthogonal codes and the plurality of other codes including quasi-orthogonal PN using a Kronecker construction which is a tensor construction, direct sum construction, as well as more general functional combining.

BRIEF DESCRIPTION OF THE DRAWINGS AND THE PERFORMANCE DATA

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 is a representative CDMA transmitter signal processing implementation block diagram with emphasis on the current multiple data rate real Walsh CDMA encoding. which contains the signal processing elements addressed by this invention disclosure.

FIG. 2 is a representative real Walsh CDMA encoding implementation diagram with emphasis on the current multiple data rate real Walsh CDMA encoding which contains the signal processing elements addressed by this invention disclosure.

FIG. 3 is a representative CDMA receiver signal processing implementation block diagram with emphasis on the current multiple data rate real Walsh CDMA decoding which contains the signal processing elements addressed by this invention disclosure.

FIG. 4 is a representative CDMA decoding implementation diagram with emphasis on the current multiple data rate real Walsh CDMA decoding which contains the signal processing elements addressed by this invention disclosure.

FIG. 5 is a representative CDMA encoding implementation diagram which describes the hybrid complex Walsh and generalized hybrid complex Walsh CDMA encoding of multiple data rate users and which contains the signal processing elements addressed by this invention disclosure.

FIG. 6 is a representative CDMA decoding implementation diagram which describes the hybrid complex Walsh and generalized hybrid complex Walsh CDMA decoding of multiple data rate users and which contains the signal processing elements addressed by this invention disclosure.

DISCLOSURE OF THE INVENTION

The invention provides the algorithms and implementation architectures to support simultaneous multiple data rates or equivalently simultaneous multiple symbol rates using the hybrid complex Walsh and generalized hybrid complex Walsh orthogonal CDMA codes which have been disclosed in the invention application Ser. No. 09/826,117. In this invention disclosure the complex Walsh codes are hybrid Walsh codes and generalized complex Walsh codes are generalized hybrid Walsh codes. Simultaneous multiple data rates over the same CDMA frequency spectrum are well known in CDMA networking and been included in the next generation UMTS 3G evolving CDMA using wideband CDMA (W-CDMA) and real Walsh orthogonal CDMA channelization codes.

The current art uses three categories of techniques designed to accommodate multiple data rate users and these are A) multiple chip length codes for the multiple data rate users, B) same chip length codes with the number of codes adjusted as required for the multiple data rate users, and C) different frequency spectrums assigned to the multiple data rate users which is frequency division multiplexing (FDM). The first technique is the preferred choice for W-CDMA primarily because of the de-multiplexing and multiplexing required for the second technique and because of the configurable multi-rate filters required for the spectrum partitioning in the third approach. This new invention implements the second and third approaches without their disadvantages and moreover provides the added performance improvements that will be realized with the use of the complex Walsh and generalized complex Walsh codes in place of the real Walsh codes. These 4-phase complex Walsh orthogonal CDMA codes replacing the current 2-phase real Walsh codes will provide improvements that include an increase in the carrier-to-noise ratio (CNR) for data symbol recovery in the receiver, lower correlation side-lobes under timing offsets both with and without PN spreading, lower levels of harmonic interference caused by non-linear amplification of multi-carrier CDMA signals, and reduced phase tracking jitter for code tracking to support both acquisition and synchronization.

The complex Walsh CDMA orthogonal codes have been invented to be the natural development for the Walsh codes and therefore are the correct complex Walsh codes to within arbitrary factors that include scale and rotation, which are not relevant to performance. This natural development of the complex Walsh codes in the N-dimensional complex code space $C^N$ extended the correspondences between the real Walsh codes and the Fourier codes in the N-dimensional real code space $R^N$, to correspondences between the complex Walsh codes and the discrete Fourier transform (DFT) codes in $C^N$.

The generalized complex Walsh orthogonal and quasi-orthogonal CDMA codes have been invented to increase the choices for the code length and for the performance by combining complex Walsh and Walsh and discrete Fourier transform complex orthogonal codes and the plurality of other codes including quasi-orthogonal PN using a Kronecker construction which is a tensor construction, direct sum construction, and functional combining.

Transmitter equations (3) describe a representative complex Walsh CDMA encoding for multiple data rate users for the transmitter in FIG. 1 using the definition of the complex Walsh CDMA codes in Ser. No. 09/826,117. The Lowest data rate users are assumed to communicate at the lowest symbol rate equal to the code repetition rate of the N chip complex Walsh code, which means each is assigned an N chip code vector from the N×N complex Walsh code matrix $\tilde{W}_N$ in 36 for their channelization code. Higher data rate users will use multiple complex Walsh codes from $\tilde{W}_N$. Reference complex Walsh code matrix $\tilde{W}_N$ has N Walsh row code vectors $\tilde{W}_N(c)$ each of length N chips and indexed by $c=0, 1, \ldots, N-1$, with $\tilde{W}_N(c)=[\tilde{W}_N(c, 0), \ldots, \tilde{W}_N(c,n-1)]$ wherein $\tilde{W}_N(c,n)$ is chip n of code c with the possible values $\tilde{W}_N(c,n)=+/-1+/-j$. Complex Walsh code vectors in the N dimensional complex code space $C^N$ are defined using the real Walsh code vectors from the N dimensional real code space $R^N$ for the real and complex code vectors using the equation $\tilde{W}_N(c)=W(cr)+jW(ci)$ where the mapping of the complex Walsh code index c into the real Walsh code indices cr and ci is defined by the mapping of c into cr(c) and ci(c) in 36. These mappings are lexicographic permutations of the real Walsh which are derived in Ser. No. 09/826,117 from the 1-to-1 sequency~frequency, cosine~even, sine~odd correspondences with the discrete Fourier transform where the symbol "~" represents a 1-to-1 correspondence, sequency is the average rate of phase rotations of the complex Walsh code vectors, the cosine and sine refer to the DFT real and imaginary code vectors, and the even and odd are the even and odd real Walsh code vectors.

The multiple data rate menu in 37 lists the possible user data symbol rates $R_s$ and the number of user code vectors or symbols transmitted over each N chip reference code length. User symbol rate $R_s=1/N(m)T$ for the users in group m is equal to the number of user data symbols or code vectors $N/N(m)$ over the N chip code block multiplied by the symbol rate $1/NT$ of the N chip code. User data rate $R_b$ in bits/second is equal to $R_b=R_s b_s$ where $b_s$ is the number of data bits encoded in each data symbol. Assuming a constant $b_s$ for all of the multiple data rate users, the user data rate becomes directly proportional to the user symbol rate $R_b \sim R_s$ which means the user symbol rate menu in 37 is equivalent to the user data rate menu.

Data symbol vector 38 stores the N data symbols $\{Z(u_{m,k_m})\}$ for the N chip code block in an 1×N dimensional data symbol vector indexed by $d=d_0+d_1 2+d_2 4+ \ldots + d_{M-2}N/4+d_{M-1}N/2=0, 1, 2, \ldots, N-1$, where the binary word representation is $d=d_0 \ldots d_{M-1}$ and the $\{d_m\}$ are the binary coefficients. With the availability of this 1×N dimensional data symbol vector, it is observed that the real Walsh implementation for the multiple data rate users in 2, 3 in equations (1) must assign the 2 chip data symbols $Z(u_0,z_k)$ to the $d_{M-1}$ field, the 4 chip data symbols $Z(u_1, z_k)$ to the $d_{M-1}d_{M-2}$ field, $\ldots$, and the N chip data symbols $Z(u_{M-1}, z_k)$ to the $d_0 \ldots d_{M-1}$ field in order to provide orthogonality between the code vectors in the different groups. For the complex Walsh the same data assignment is used with the modification that the $N/N(m)$ data symbols for the $N(m)$ chip code vectors of group m assigned to data field $d_{M-m} d_{M-m+1} \ldots d_{M-1}$ of d using the real Walsh, are now mapped into $N/N(m)$ N-chip code vectors over the same group m data field $d_{M-m}d_{M-m+1} \ldots d_{M-1}$ of d. This allows a fast algorithm to be used and uses the N chip codes over the $d_{M-m}d_{M-m+1} \ldots d_{M-1}$ field and enables each user group to occupy the same sequency band as the frequency band for FDM. This removes the disadvantages of using technique "B" and "C" for W-CDMA, and helps to make the complex Walsh the preferred choice compared to technique "A" which is the current art preferred choice with real Walsh.

This invention has found a means to use the same data fields of the current W-CDMA for real Walsh, for application to the complex Walsh with the added advantages of a fast transform, simultaneous transmission of the user data symbols, and the assignment of these user data symbols to a contiguous sequency band specified by the data field of d for additional isolation between users. For a fully loaded CDMA communications frequency band the N data symbols for the multiple rate users occupy the N available data symbol locations in the data symbol vector $d = d_0 \ldots d_{M-1}$. The construction of the data symbol vector is part of this invention disclosure and provides a means for the implementation of a fast complex Walsh encoding and decoding of the multiple data rate complex Walsh CDMA. Examples 1 and 2 in 39 and 40 illustrate representative user assignments to the data fields of the data symbol vector. This mapping of the user data symbols into the data symbol vector is equivalent to setting $c=d$ which makes it possible to develop the fast encoding algorithm 41.

Multiple data rate encoding for transmitter (3)

36 N chip complex Walsh code block

---

$\tilde{W}_N$ = complex Walsh $N \times N$ orthogonal code matrix consisting of N rows of N chip code vectors = $[\tilde{W}_N(c)]$ matrix of row vectors $\tilde{W}_N(c)$ = $[\tilde{W}_N(c, n)]$ matrix of elements $\tilde{W}_N(c, n)$ $\tilde{W}_N(c)$ = complex Walsh code vector $c$ = $W_N(cr) + jW_N(ci)$ for $c = 0, 1, \ldots, N$ $W_N(cr), W_N(ci)$ = Real Walsh $1 \times N$ code vectors $cr, ci$ $c = 0, 1, 2, \ldots, N-1$ = Real Walsh code index for N chip block = $(cr, ci)$ Pair of real Walsh code vectors $cr = cr(c)$ and $ci = ci(c)$ which are assigned to the real and to the imaginary axes $n = 0, 1, 2, \ldots, N-1$ = Chip index for N chip block

---

Mapping of real Walsh to complex Walsh

| Complex Walsh code c | Real Axis real Walsh codes cr(c) | Complex Axis real Walsh codes ci(c) |
|---|---|---|
| 0 | 0 | 0 |
| 1, 2, ..., N/2 − 1 | 2c | 2c − 1 |
| N/2 | N − 1 | N − 1 |
| N/2 + 1, ..., N − 1 | 2N − 2c − 1 | 2N − 2c |

-continued $\tilde{W}(c, n)$ = complex Walsh code u chip n

= $+/-1 +/- j$ possible values

= $(-1) \wedge \left[ cr_{M-1} n_0 + \sum_{i=1}^{i=M-1} (cr_{M-1-i} + cr_{M-i}) n_i \right] +$ $j(-1) \wedge \left[ ci_{M-1} n_0 + \sum_{i=1}^{i=M-1} (ci_{M-1-i} + ci_{M-i}) n_i \right]$ $cr = \sum_{i=0}^{i=M-1} cr_i 2^i$ binary representation of cr $ci = \sum_{i=0}^{i=M-1} ci_i 2^i$ binary representation of ci $n = \sum_{i=0}^{i=M-1} n_i 2^i$ binary representation of n $\tilde{W}(c) = W_N(cr) + jW_N(ci)$ for $c_m = 0, 1, \ldots, 2^m - 1$

---

37 Multiple data rate menu

Symbol rate menu for multiple data rates

| Symbol rate | Symbol rate, Symbols/second | Symbols or code vectors per N chips |
|---|---|---|
| $R_s$ = | 1/2 T | N/2 |
| = | 1/4 T | N/4 |
| = | 1/8 T | N/8 |
| . | . | . |
| . | . | . |
| . | . | . |
| = | 1/2 NT | 2 |
| = | 1/NT | 1 |

38 Data symbol vector field indexed by $d = d_0 + d_1 2 + d_2 4 + \ldots + d_{M-2} N/4 + d_{M-1} N/2$ is partitioned into M data fields with each assigned to one group of multiple data rate users. Writing d as a binary word $d = d_0 d_1 \ldots d_{M-1}$ enables the data fields to be identified as $d_{M-1}$, $d_{M-1} d_{M-2}$, $d_{M-1} d_{M-2} d_{M-3}$, ..., $d_0 \ldots d_{M-1}$ which respectively are assigned to the user groups $u_0, u_1, \ldots, u_{M-1}$.

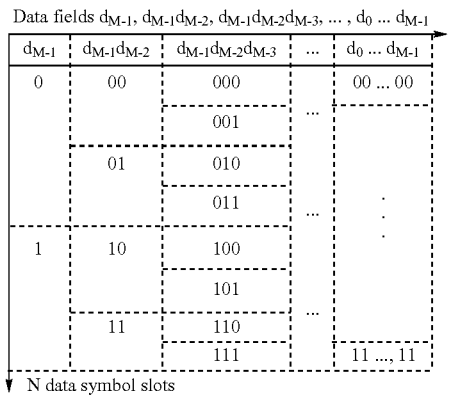

Data fields $d_{M-1}, d_{M-1}d_{M-2}, d_{M-1}d_{M-2}d_{M-3}, \ldots, d_0 \ldots d_{M-1}$

| $d_{M-1}$ | $d_{M-1}d_{M-2}$ | $d_{M-1}d_{M-2}d_{M-3}$ | ... | $d_0 \ldots d_{M-1}$ |
|---|---|---|---|---|
| 0 | 00 | 000 | ... | 00 ... 00 |
|   |    | 001 |     |          |
|   | 01 | 010 |     |          |
|   |    | 011 | ... | .        |
| 1 | 10 | 100 |     | .        |
|   |    | 101 |     | .        |
|   | 11 | 110 | ... |          |
|   |    | 111 |     | 11 ..., 11 |

↓ N data symbol slots

-continued

Menu of user assignments to the data vector fields

| User group | Available channalization codes | Field assignment in data vector |
|---|---|---|
| $u_0$ | $u_0 = 0$<br>$u_0 = 1$ | $d_{M-1} = 0$<br>$= 1$ |
| $u_1$ | $u_1 = 0$<br>$u_1 = 1$<br>$u_1 = 2$<br>$u_1 = 3$ | $d_{M-1}d_{M-2} = 00$<br>$= 01$<br>$= 10$<br>$= 11$ |
| . | . | . |
| . | . | . |
| . | . | . |
| $u_{M-1}$ | $u_{M-1} = 0$<br>.<br>.<br>.<br>$u_{M-1} = N - 1$ | $d_0 ... d_{M-1} = 00 ... 00$<br>.<br>.<br>.<br>$= 11 ... 11$ |

39 Example 1 of multiple data rate menu:
There is 1 user for each group $u_0, u_1, \ldots, u_{M-2}$ and 2 users for $u_{M-1}$ with each user selecting the lowest sequency channel corresponding to the lowest index of channels available to the group.
Example 1 of multiple data rate menu

| $d_{M-1}$ | $d_{M-1}d_{M-2}$ | $d_{M-1}d_{M-2}d_{M-3}$ | ... | $d_0 ... d_{M-1}$ |
|---|---|---|---|---|
|  | 00 | 000 |  | 00 ... 00 |
|  |  | 001 | ... |  |
|  | 01 | 010 |  | . |
|  |  | 011 |  | . |
| 1 |  | 100 | ... | . |
|  |  | 101 |  |  |
|  | 11 |  |  |  |
|  |  | 111 |  |  |

↓ N data symbol slots

40 Example 2 of multiple data rate menu:
There is 1 user in each group $u_0$ and $u_1$ and 2 users in $u_2$ with each user selecting the highest sequency channel corresponding to the highest index of channels available to the group.
Example 2 of multiple data rate menu

| $d_{M-1}$ | $d_{M-1}d_{M-2}$ | $d_{M-1}d_{M-2}d_{M-3}$ | ... | $d_0 ... d_{M-1}$ |
|---|---|---|---|---|
| 0 | 00 |  |  | 00 ... 00 |
|  |  |  | ... |  |
|  |  | 010 |  |  |
|  |  | 011 |  | . |
|  | 10 | 100 | ... | . |
|  |  | 101 |  |  |
|  | 11 | 110 |  |  |
|  |  | 111 | ... | 11, ..., 11 |

↓ N data symbol slots

41 Complex Walsh encoding and channel combining uses a computationally efficient fast encoding algorithm. This algorithm implements the encoding with an M pass computation. Passes 1, 2, 3, ..., M respectively perform the 2, 4, 8, ..., N chip complex Walsh encoding of the data symbol vector successively starting with the 2 chip encoding in pass 1, the 4 chip encoding in passes 1, 2, the 8 chip encoding in pass 1, 2, 3, and the N chip encoding in passes 1, 2, 3, ..., M where $N=2^M$. Using the binary word representations for both d and n, this M pass algorithm is:

Pass 1:

$$Z^{(1)}(n_{M-1}d_1 \ldots d_{M-1}) = \sum_{d_0=dr_0=di_0=0,1} Z(d_0 \cdots d_{M-1})[(-1)\wedge dr_0 n_{M-1} + j(-1)\wedge di_0 n_{M-1}]$$

⋮

Pass $m$ for $m = 2, \ldots, M-1$ $$Z^{(m)}(n_{M-1} \ldots n_{M-m}d_m \ldots d_{M-1}) = \sum_{d_{m-1}=dr_{m-1}=di_{m-1}=0,1} Z^{(m-1)}(n_{M-1} \ldots n_{M-m+1}d_{m-1} \ldots d_{M-1}) \cdot [(-1)\wedge dr_{m-1}(n_{M-m} + n_{M-m+1}) + j(-1)\wedge di_{m-1}(n_{M-m} + n_{M-m+1})]$$

⋮

Pass $M$:

$$Z^{(m)}(n_{M-1}n_{M-2} \ldots n_1 n_0) = \sum_{d_{M-1}=dr_{M-1}=di_{M-1}=0,1} Z^{(M-1)}(n_{M-1}n_{M-2}\ldots n_1 d_{M-1}) \cdot [(-1)\wedge dr_{M-1}(n_0 + n_1) = j(-1)\wedge di_{M-1}(n_0 + n_1)] = \tilde{Z}(n_{M-1}n_{M-2} \ldots n_1 n_0)$$

An additional re-ordering pass is added to change the encoded N chip block $\tilde{Z}(n_{M-1}n_{M-2} \ldots n_1 n_0)$ in bit reversed ordering to the normal readout ordering $$\hat{Z}(n_0 n_1 \ldots n_{M-2}n_{M-1}) = \tilde{Z}(n)$$

42 PN scrambling $P_R(n), P_I(n) = $ PN code chip $n$ for real and Imaginary axes $Z(n) = $ PN scrambled complex Walsh encoded data chips after summing over the users $$= \sum_u \tilde{Z}(n)[P_R(n) + jP_I(n)]$$

$$= \sum_u \tilde{Z}(n)[sgn\{P_R(n)\} + jsgn\{P_I(n)\}]$$

The fast algorithm in 41 is a computationally efficient means to implement the complex Walsh encoding of each N chip code block for multiple data rate users whose lowest data rate corresponds to the data symbol rate of an N chip encoded user. It is easily demonstrated that the number of real additions $R_A$ per data symbol is approximately equal to $R_A \approx 2M+2$ in the implementation of this fast algorithm 41, where $N=2^M$. For the real Walsh encoding it is well known that the fast algorithm requires $R_A \approx M+1$ real additions per data symbol. Although the number of real adds has been doubled in using the complex Walsh compared to the real Walsh, the add operations are a low complexity implementation cost which means that the complex Walsh maintains its attractiveness as a zero-multiplication CDMA encoding orthogonal code set.

The fast algorithm in 41 consists of M signal processing passes on the stored data symbols to generate the complex Walsh CDMA encoded chips in bit reversed order. A re-ordering pass can change the bit reversed output to the normal output. Advantage is taken of the equality c=d which allows the d to be used in the code indices for the complex Walsh: $d_m = c_m$, dr=cr, di=ci. Pass 1 implements 2 chip encoding, pass 2 implements 4 chip encoding, . . . , and the last pass M performs $N=2^M$ chip encoding.

PN scrambling of the complex Walsh CDMA encoded chips in 42 is accomplished by encoding the $\{\tilde{Z}(n)\}$ with a complex PN which is constructed as the complex code sequence $[P_R(n)+jP_I(n)]$ wherein $P_R(n)$ and $P_I(n)$ are independent PN sequences used for the real and imaginary axes of the complex PN. These PN codes are 2-phase with each chip equal to +/−1 which means PN encoding consists of sign changes with each sign change corresponding to the sign of the PN chip. Encoding with PN means each chip of the summed complex Walsh encoded data symbols has a sign change when the corresponding PN chip is −1, and remains unchanged for +1 values. This operation is described by a multiplication of each chip of the summed complex Walsh encoded data symbols with the sign of the PN chip. Purpose of the PN encoding for complex data symbols is to provide scrambling of the summed complex Walsh encoded data symbols as well as isolation between groups of users. Output of this complex Walsh CDMA encoding followed by the complex PN scrambling are the CDMA encoded chips over the N chip block $\{Z(n)\}$.

Transmitter equations (6) for generalized complex Walsh orthogonal encoding of multiple data rate users are derived by starting with the hybrid complex Walsh orthogonal codes disclosed in Ser. No. 09/826,117. The discrete Fourier transform (DFT) CDMA codes used in the example generation of hybrid complex Walsh orthogonal CDMA codes are given in equations (4) along with a fast encoding algorithm.

N-chip DFT complex orthogonal CDMA codes (4)

43 DFT code vectors $$E_N = \text{DFT } N \times N \text{ orthogonal code matrix consisting of } N$$
$$\text{rows of } N \text{ chip code vectors}$$
$$= [E_N(c)] \text{ matrix of row vectors } E(c)$$
$$= [E_N(c, n)] \text{ matrix of elements } E(c, n)$$
$$E_N(c) = \text{DFT code vector } c$$
$$= [E_N(c, 0), E_N(c, 1), \ldots, E_N(c, N-1)]$$
$$= 1 \times N \text{ row vector of chips } E_N(c, 0), \ldots, E_N(c, N-1)$$
$$E_N(c, n) = \text{DFT code } c \text{ chip } n$$
$$= e^{j2\pi cn/N}$$
$$= \cos(2\pi cn/N) + j\sin(2\pi cn/N)$$
$$= N \text{ possible values on the unit circle}$$

44 Fast encoding algorithm for N chip block of data in the data vector $d = d_0 d_1 \ldots d_{M-2} d_{M-1}$ Pass 1:

$$Z^{(1)}(d_0 d_1 \ldots d_{M-2} n_0) = \sum_{d_{M-1}=0,1} Z(d_0 d_1 d_2 \ldots d_{M-2} d_{M-1}) e^{\wedge} j2\pi d_{M-1} n_0/2$$

$\vdots$

Pass $m$ for $m = 2, \ldots, M-1$ $$Z^{(m)}(d_0 \ldots d_{M-m-1} n_{m-1} \ldots n_0) = \sum_{d_{M-m}} e^{\wedge} j2\pi [d_{M-m}(n_0 + n_1 2 + \ldots + n_{m-1} 2^{\wedge}(m-1))/2^m]$$

$\vdots$

Pass $M$ for $m-2, \ldots, M-1$ $$Z^{(M)}(n_{M-1} \ldots n_0) = \sum_{d_0} Z^{(m-1)}(d_0 n_{M-2} \ldots n_0) \cdot e^{\wedge} j2\pi [d_0(n_0 +$$
$$n_1 2 + \ldots + n_{M-1} 2^{\wedge}(M-1))/2^M] =$$
$$\tilde{Z}(n_{M-1} n_{M-2} \ldots n_1 n_0)$$

An additional re-ordering pass is added to change the encoded N chip block $\tilde{Z}(n_{M-1} n_{M-2} \ldots n_1 n_0)$ in bit reversed ordering to the normal readout ordering $$\tilde{Z}(n_0 n_1 \ldots n_{M-2} n_{M-1}) = \tilde{Z}(n)$$

DFT code matrix and the row code vectors are defined in 43 for an N chip block. A fast algorithm for the encoding of the N chip data vector $Z(d_0 d_1 d_2 \ldots d_{M-2} d_{M-1})$ is defined in 44 in a format similar to the fast algorithm for the complex Walsh encoding in equations (3). It is well known that the computational complexity of the fast DFT encoding algorithm is $R_A \approx 2M$ real additions per data symbol plus $R_M \approx 3M$ real multiplications per data symbol. The relatively high complexity implementation cost of multiplies makes it desirable to limit the use of DFT codes to applications such as the generalized hybrid complex Walsh wherein the number of real multiplies per data symbol can be kept more reasonable.

Generalized complex Walsh orthogonal CDMA codes increase the flexibility in choosing the code lengths for multiple data rate users at the implementation cost of introducing multiply operations into the CDMA encoding and decoding. Two other means for construction given in Ser. No. 09/826,117 are the direct sum and functional combining. The direct sum and functional combining have fast encoding and decoding algorithms for multiple data rate applications and provide greater flexibility in the choice of N without necessarily introducing a multiply penalty. Other codes considered for construction include the orthogonal Walsh and the quasi-orthogonal PN as well as the plurality of possible codes Equations (5) list construction and examples of the generalized complex Walsh orthogonal CDMA codes using the Kronecker approach and DFT matrices $E_N$ to expand the complex Walsh to a generalized complex Walsh. Low order CDMA code examples 45 illustrate fundamental relationships between the DFT, complex Walsh, and the real Walsh or equivalently Hadamard. Kronecker construction is defined in 46. CDMA current and developing standards use the prime 2 which generates a code length $N=2^M$ where M=integer. For applications requiring greater flexibility in code length N, additional primes can used using the Kronecker construction. We illustrate this in the examples 47 with the addition of prime=3. The use of prime=3 in addition to the prime=2 in the range of N=8 to 64 is observed to increase the number of N choices from 4 to 9 at a modest cost penalty of using multiples of the angle increment 30 degrees for prime=3 in addition to the angle increment 90 degrees for prime=2. As noted in 46 there are several choices in the ordering of the Kronecker product construction and 2 of these choices are used in the construction.

Examples of generalized hybrid Walsh orthogonal codes (5)

45 Examples of low-order codes $$2 \times 2 \quad E_2 = \begin{bmatrix} 1 & 1 \\ 1 & -1 \end{bmatrix}$$
$$= (e^{-j\pi/4}/\sqrt{2}) * \tilde{W}_2$$
$$= H_2 \; 2 \times 2 \text{ Hadamard}$$

$$3 \times 3 \quad E_3 = \begin{bmatrix} 1 & 1 & 1 \\ 1 & e^{j2\pi/3} & e^{j2\pi2/3} \\ 1 & e^{j2\pi2/3} & e^{j2\pi/3} \end{bmatrix}$$

$$4 \times 4 \quad \tilde{W}_4 = \begin{bmatrix} 1+j & 1+j & 1+j & 1+j \\ 1+j & -1+j & -1-j & 1-j \\ 1+j & -1-j & 1+j & -1-j \\ 1+j & 1-j & -1-j & -1+j \end{bmatrix}$$

$$E_4 = \begin{bmatrix} 1 & 1 & 1 & 1 \\ 1 & j & -1 & -j \\ 1 & -1 & 1 & -1 \\ 1 & -j & -1 & j \end{bmatrix}$$
$$= (e^{-j\pi/4}/\sqrt{2})\tilde{W}_4$$

46 Kronecker product construction for $$N = \prod_k N_k$$

Code matrix $C_N$=N×N generalized hybrid orthogonal CDMA code matrix

Kronecker product construction of $C_N$ $$C_N = C_0 \prod_{k>0} \bigotimes C_{N_k} \quad \text{Kronecker product definition}$$

$A = N_a \times N_a$ orthogonal code matrix $B = N_b \times N_b$ orthogonal code matrix $A \otimes B$ = Kronecker product of matrix A and matrix B $\quad = N_a N_b \times N_a N_b$ orthogonal code matrix consisting of the elements $[a_{ik}]$ of matrix A multiplied by the matrix B $\quad = [a_{ik} B]$ 47 Kronecker product construction examples for primes $p = 2, 3$ and the range of sizes $8 \leq N \leq 64$ $8 \times 8 \quad C_8 = \tilde{W}_8$ $12 \times 12 \quad C_{12} = \tilde{W}_4 \otimes E_3$ $\qquad\qquad C_{12} = E_3 \otimes \tilde{W}_4$ $16 \times 16 \quad C_{16} = \tilde{W}_{16}$ $18 \times 18 \quad C_{18} = \tilde{W}_2 \otimes E_3 \otimes E_3$ $\qquad\qquad C_{18} = E_3 \otimes E_3 \otimes \tilde{W}_2$ $24 \times 24 \quad C_{24} = \tilde{W}_8 \otimes E_3$ $\qquad\qquad C_{24} = E_3 \otimes \tilde{W}_8$ $32 \times 32 \quad C_{32} = \tilde{W}_{32}$ $36 \times 36 \quad C_{36} = \tilde{W}_4 \otimes \tilde{W}_3 \otimes \tilde{W}_3$ $\qquad\qquad C_{36} = \tilde{W}_3 \otimes \tilde{W}_3 \otimes \tilde{W}_4$ $48 \times 48 \quad C_{48} = \tilde{W}_{16} \otimes \tilde{W}_3$ $\qquad\qquad C_{48} = \tilde{W}_3 \otimes \tilde{W}_{16}$ $64 \times 64 \quad C_{64} = \tilde{W}_{64}$ A fast algorithm for the encoding of the generalized complex Walsh CDMA orthogonal codes is described in equations (6) for the representative example 48 which constructs the N×N generalized complex Walsh orthogonal CDMA code matrix $C_N = E_{N_1} \otimes \tilde{W}_{N_0}$ as the Kronecker product of the $N_0 \times N_0$ complex Walsh $\tilde{W}_{N_0}$ and the $N_1 \times N_1$ complex DFT, where $N = N_0 N_1$. Each chip element of $C_N$ is the product 49 of the chip elements of the complex Walsh and complex DFT code matrices. The complex Walsh and DFT codes are phase codes which means the phase of each $C_N$ chip element is the sum of the phases of the chip elements for the complex Walsh and complex DFT. Chip element equations are $C_N(c,n) = \tilde{W}_{N_0}(c\tilde{w}, n\tilde{w}) E_{N_1}(ce, ne)$ with $c = ce + c\tilde{w} N_1$ and $n = ne + n\tilde{w} N_1$. For multiple data rate data symbol assignments and for the construction of the fast encoding algorithm, it is convenient to use a binary word representation of the chip element indices c,n. Binary word representation 50 is $c = ce_0 ce_1 \ldots ce_{M_1-1} c\tilde{w}_{M_1} c\tilde{w}_{M_1+1} + \ldots c\tilde{w}_{M-1} = c_0 c_1 \ldots c_{M-2} c_{M-1}$ where the first binary word is a function of the binary words for the complex Walsh and complex DFT code indices, and the second binary word is a direct representation of the $C_N$ indices which will be used for the data vector construction. The same binary word representations apply for the chip index n upon substituting the n for c. User data 38 in equations (3) for the N chip code block is mapped into the N data symbol vector $d = d_0 \ldots d_{M-1}$ which is obtained from the binary word for c by substituting the index d for the index c in the binary word representation.

The multiple data rate data symbol mapping 51 in equations (6) for the generalized complex Walsh codes remains the same as used in 38, 39, 40 in equations (3) for the complex Walsh codes. The data symbol mapping assigns the N/2 data symbols of the 2 chip data symbol transmission rate users to the $d_{M-1}$ field, the N/4 data symbols of the 4 chip data symbol transmission rate users are assigned to the $d_{M-1} d_{M-2}$ field, ..., and the single data symbols of the N chip data symbol transmission rate users are assigned to the $d_0 \ldots d_{M-1}$ field. For a fully loaded CDMA communications frequency band the N data symbols occupy the N available data symbol locations in the data symbol vector $d = d_0 \ldots d_{M-1}$. The menu of available user assignments to the data vector fields is given in 38 in equations (3). Examples 1 and 2 in 39 and 40 in equations (3) illustrate representative user assignments to the data fields of the data symbol vector. This mapping of the user data symbols into the data symbol vector is equivalent to setting c=d which makes it possible to develop the fast encoding algorithm 51.

Fast multiple data rate generalized hybrid Walsh encoding for transmitter (6)

48 The fast algorithm will be described for the example N×N complex orthogonal CDMA code matrix $C_N$ which is generated by the Kronecker product of the $N_0 \times N_0$ complex Walsh matrix $\tilde{W}_{N_0}$ and the complex $N_1 \times N_1$ DFT matrix $E_{N_1}$ $$C_N = \text{Kronecker product of } \tilde{W}_{N_0} \text{ and } E_{N_1}$$
$$= E_{N_1} \otimes \tilde{W}_{N_0}$$

where $N = N_0 N_1$
$$= 2 \wedge M$$
$$M = M_0 + M_1$$
$$N_0 = 2 \wedge M_0$$
$$N_1 = 2 \wedge M_1$$

49 N chip generalized complex Walsh code block $C_N$ $C_N$ = hybrid complex Walsh $N \times N$ orthogonal code matrix consisting of $N$ rows of $N$ chip code vectors $= [C_N(c)]$ matrix of row vectors $C_N(c)$ $= [C_N(c,n)]$ matrix of elements $C_N(c,n)$ $C_N(c,n)$ = hybrid complex Walsh code $c$ chip $n$ $= \tilde{W}_{N_0}(c\tilde{w}, n\tilde{w}) E_{N_1}(ce, ne)$ $= [+/-1 +/-j] E_{N_1}(ce, ne)$ values where $c = ce + c\tilde{w} N_1$ $n = ne + n\tilde{w} N_1$ 50 Binary indexing of codes in the matrix $C_N$ $c = ce_0 + ce_1 2 + \ldots + ce_{M_1-1} 2 \wedge (M_1 - 1) +$ $c\tilde{w}_{M_1} 2 \wedge M_1 + c\tilde{w}_{M_1+1} 2 \wedge (M_1 + 1) + \ldots + c\tilde{w}_{M-1} 2 \wedge M - 1$ $= ce_0 ce_1 \ldots ce_{M_1-1} c\tilde{w}_{M_1} c\tilde{w}_{M_1+1} \ldots c\tilde{w}_{M-1}$ Binary word $n = ne_0 + ne_1 2 + \ldots + ne_{M_1-1} 2 \wedge (M_1 - 1) +$ $n\tilde{w}_{M_1} 2 \wedge M_1 + n\tilde{w}_{M_1+1} 2 \wedge (M_1 + 1) + \ldots + n\tilde{w}_{M-1} 2 \wedge M - 1$ $= ne_0 ne_1 \ldots ne_{M_1-1} n\tilde{w}_{M_1} n\tilde{w}_{M_1+1} \ldots n\tilde{w}_{M-1}$ Binary word 51 The fast encoding algorithm starts with the data symbol vector d and mapping of the user groups $u_0, u_1, \ldots, u_{M-1}$ into the data fields of d. This mapping is identical to the mapping defined in equations (3) for the multiple data rate complex Walsh orthogonal encoding of the CDMA over an N chip block. However, the fast algorithm for the hybrid complex Walsh encoding is modified to accommodate the Kronecker construction as illustrated by the following fast algorithm for the hybrid complex Walsh example in 48. Using the binary representations of d,n $$d = d_0 d_1 \ldots d_{M_1-1} d_{M_1} \ldots d_{M-1}$$
$$= de_0 de_1 \ldots de_{M_1-1} d\tilde{w}_{M_1} \ldots d\tilde{w}_{M-1}$$
$$n = n_0 n_1 \ldots n_{M_1-1} n_{M_1} \ldots n_{M-1}$$
$$= ne_0 ne_1 \ldots ne_{M_1-1} n\tilde{w}_{M_1} \ldots n\tilde{w}_{M-1}$$

and the same approach used to derive the fast algorithms 41 in equations (3) and 44 in equations (4), enables the M pass fast algorithm to be defined Pass 1 for complex Walsh codes $Z^{(1)}(d_0 \ldots d_{M_1-1} n_{MI} d_{M_1+1} \ldots d_{M-1}) =$ $$\sum_{d_{M_1} = dr_{M_1} = di_{M_1} = 0,1} [(-1) \wedge dr_{MI} n_{M_1} + j(-1) \wedge di_{MI} n_{M_1} +]$$

Pass $m$ for $m = 2, \ldots, M_0$ for complex Walsh codes $Z^{(m)}(d_0 \ldots d_{M_1-1} n_{M_0-1} \ldots n_{M_0-m} d_{M_1+m} \ldots d_{M-1}) =$ $$\sum_{d_{M_1+m-1} = dr_{m-1} = di_{m-1} = 0,1} Z^{(m-1)}(d_0 \ldots d_{M_1-1} n_{M_0-1} \ldots$$

$n_{M_0-m+1} d_{M_1+m-1} \ldots d_{M-1}) \cdot [(-1) \wedge dr_{m-1}(n_{M_0-m} + n_{M_0-m+1}) +$ $j(-1) \wedge di_{m-1}(n_{M_0-m} + n_{M_0-m+1})]$ $\vdots$ Pass $M_0 + m = M - 0 + 1, \ldots, M_0 + M_1 - 1 = M - 1$ for complex DFT codes $Z^{(M_0+m)}(d_0 \ldots d_{M_1-m-1} n_{M_0+m-1} \ldots n_0) =$ $$\sum_{d_{M_1-m} = 0,1} Z^{(M_0+m-1)}($$

$d_0 \ldots d_{M_1-m-1} n_{M_0+m-2} \ldots n_0) \cdot [e \wedge j2\pi) \wedge$ $d_{M_1-m}(n_{M_0} + n_{M_0+1} 2 + \ldots + n_{M_0+m-1} 2 \wedge m - 1)/2 \wedge m]$ $\vdots$ Pass $M$ for complex DFT codes $Z^{(M)}(n_{M-1} \ldots n_1 n_0) =$ $$\sum_{d_0 = 0,1} Z^{(M-1)}(d_0 n_{M-2} \ldots n_1 n_0) \cdot [e \wedge j2\pi) \wedge d_0(n_{M_0} + n_{M_0+1} 2 + \ldots +$$

$n_{M-1} 2 \wedge M_0 - 1)/2 \wedge M_0] = \tilde{Z}(n_{M-1} n_{M-2} \ldots n_1 n_0)$ An additional re-ordering pass is added to change the encoded N chip block $\tilde{Z}$ ($n_{M-1} n_{M-2} \ldots n_1 n_0$) in bit reversed ordering to the normal readout ordering $\hat{Z}(n_0 n_1 \ldots n_{M-2} n_{M-1}) = \tilde{Z}(n)$ The fast algorithm in 51 is a computationally efficient means to implement the generalized complex Walsh encoding of each N chip code block for multiple data rate users whose lowest data rate corresponds to the data symbol rate of an N chip encoded user. The computational complexity of this fast encoding algorithm can be estimated using the computational complexities of the complex Walsh and the DFT fast encoding algorithms, which gives the estimate: $R_A \approx 2M+M_1+2$ real additions per data symbol, and $R_M \approx 2M_1$ real multiplies per data symbol.

The fast algorithm in 51 consists of M signal processing passes on the stored data symbols, followed by a re-ordering pass for readout of the N chip block of encoded data symbols. Advantage is taken of the equality c=d which allows the d to be used in the code indices for the complex Walsh: $d_m = c_m$, dr=cr, di=ci. Pass 1 implements 2 chip encoding, passes m=2, . . . , $M_0$ implement $2^m$ chip encoding with the complex Walsh codes, passes $M_0+1$, $M_0+2$, . . . , $M_0+M_1-1=M-1$ implement $2^{M_0+m}$ chip encoding with the complex DFT codes, and the last pass M encodes the $N=2^M$ chip data symbols with the DFT codes. This fast algorithm only differs from the fast algorithms in 41, 44 in equations (3), (4) in the use of both the complex Walsh codes and the complex DFT codes with their Kronecker indexing. Unlike the fast algorithm for the real Walsh encoding as well as the algorithm for the complex DFT encoding, the complex Walsh portion of the fast algorithm 51 uses both the sign of the complex Walsh code from the current pass and from the previous pass starting with pass 2.

The generalization of the fast algorithm in 51 in equations (6) to other Kronecker product constructions for $C_N$ and to the more general constructions for $C_N$ should be apparent to anyone skilled in the CDMA communications art.

Receiver equations (7) describe a representative multiple data rate complex Walsh CDMA decoding for multiple data users for the receiver in FIG. 3 using the definition of the hybrid complex Walsh CDMA codes in 36 in equations (3). The receiver front end 52 provides estimates $\{\hat{Z}(n)\}$ of the transmitted multiple data rate complex Walsh CDMA encoded chips $\{Z(n)\}$. Orthogonality property 53 is expressed as a matrix product of the complex Walsh code chips or equivalently as a matrix product of the complex Walsh code chip numerical signs of the real and imaginary components, for any of the 2, 4, 8, . . . , N/2, N chip complex Walsh channelization codes. The 2-phase PN codes 54 have the useful decoding property that the square of each code chip is unity which is equivalent to observing that the square of each code chip numerical sign is unity.

Receiver multiple data rate decoding of hybrid and generalized hybrid Walsh CDMA (7)

52 Receiver front end in FIG. 3 provides estimates $\{\hat{Z}(n)\}$ 28 of the encoded transmitter chip symbols $\{Z(n)\}$ 41 in equations (3)

53 Orthogonality properties of the complex Walsh N×N matrix $$\sum_n \tilde{W}_N(\tilde{c}, n)\tilde{W}_N*(n, c) = \sum_n [\text{sgn}\{W_N(\tilde{c}r, n)\} +$$

$$j\text{sgn}\{W_N(\hat{c}i, n)\}][\text{sgn}\{W_N(n, cr)\} -$$

$$j\text{sgn}\{W_N(n, ci)\}]$$

$$= 2N\delta(\hat{c}, c)$$

where $\hat{c}, c, n = 0, 1, \ldots, N$ $\delta(\hat{c}, c) =$ Delta function of $\hat{c}$ and $c$ $= 1$ for $\hat{c} = c$ $= 0$ otherwise $cr = cr(c), ci = ci(c)$ are defined in equations (3)

54 PN de-scrambling of the receiver estimates of the hybrid and generalized complex Walsh encoded data chips $P_R(n), P_I(n)$=PN code chip n for real and imaginary axes $\hat{\tilde{Z}}(n) =$ PN de − scrambled receiver estimates of the transmitted CDMA encoded chips $\hat{Z}(n)$ $= \hat{Z}(n)[P_R(n) - jP_I(n)]$ 55a Complex Walsh decoding and uses a computationally efficient fast encoding algorithm. This algorithm implements the decoding with an M pass computation. Passes 1, 2, 3, . . . , M respectively perform the 2, 4, 8, . . . , N chip complex Walsh decoding of the data symbol vector successively starting with the 2 chip decoding in pass 1, the 4 chip decoding in passes 1, 2, and the N chip decoding in passes 1, 2, 3, . . . , M where $N=2^M$. Using the binary word representations for both d and n, this M pass algorithm is:

Pass 1:

$$\hat{Z}^{(1)}(d_{M-1}n_1 n_2 \ldots n_{M-2}n_{M-1}) =$$

$$\sum_{n_0=0,1} \hat{Z}(n_0 n_1 n_2 \ldots n_{M-2}n_{M-1}) \cdot [(-1)^{\wedge} n_0 dr_{M-1} - j(-1)^{\wedge} n_0 di_{M-1}]$$

⋮

Pass $m$ for $m = 2, \ldots, M - 1$ $$\hat{Z}^{(m)}(d_{M-1}d_{M-2} \ldots d_{M-m}n_m \ldots n_{M-2}n_{M-1}) =$$

$$\sum_{n_{m-1}=0,1} \hat{Z}^{(m-1)}(d_{M-1}d_{M-2} \ldots d_{M-m+1}n_{m-1} \ldots n_{M-2}n_{M-1}) \cdot [(-1)^{\wedge}$$

$$n_{m-1}(dr_{M-m} + dr_{M-m+1}) - j(-1)^{\wedge} n_{m-1}(di_{M-m} + di_{M-m+1})]$$

⋮

Pass $M$ $$\hat{Z}^{(M)}(d_{m-1}d_{m-2} \ldots d_0) =$$

$$\sum_{n_{M-1}=0,1} \hat{Z}^{(M-1)}(d_{M-1}d_{M-2} \ldots d_1 n_0) \cdot [(-1)^{\wedge} n_{M-1}(dr_0 dr_1) -$$

$$j(-1)^{\wedge} n_{M-1}(di_0 + di_1)] = N\hat{Z}(d_{m-1}d_{m-2} \ldots d_0)$$

An additional re-ordering pass is added to change the decoded N chip block $\hat{Z}$ ($d_{m-1}d_{m-2}$ . . . $d_0$) in bit reversed ordering to the normal readout ordering. In this representative fast implementation the scaling factor N has been removed in the re-ordering pass whereas a typical implementation will re-scale each pass. The output of this final pass is the receiver estimate of the transmitted data symbol vector $\hat{Z}(d_0 d_2 \ldots d_{M-1}) = \hat{Z}(d)$ 55b Generalized complex Walsh decoding uses a computationally efficient fast encoding algorithm. Similar to the complex Walsh this algorithm implements the decoding with an M pass computation for m=1, 2, 3, ..., M:

Pass $m = 1, \ldots, M_1$ for complex DFT codes $\hat{Z}^{(m)}(n_0 \ldots n_{M-m-1}d_{m-1} \ldots d_0) =$ $$\sum_{n_{M-m}=0,1} \hat{Z}^{(m-1)}(n_0 \ldots n_{M-m}d_{m-2} \ldots d_0) \cdot [e \wedge j2\pi) \wedge$$

$$n_{M-m}(d_0 + d_1 2 + \ldots + d_{m-1} 2 \wedge m - 1)/2 \wedge m]$$

⋮

Pass $M_1 + m = M_1 + 1, M_1 + 2, \ldots, M - 1$ for complex Walsh codes $\hat{Z}^{(M_1+m)}(d_{M-1} \ldots d_{M-m}n_m \ldots n_{M_0-1}d_{M_1-1} \ldots d_0) =$ $$\sum_{n_{m-1}=0,1} \hat{Z}^{(M_1+m-1)}(d_{M-1} \ldots d_{M-m-1}n_{m-1} \ldots n_{M_0-1}d_{M_1-1} \ldots d_0) \cdot [(-1) \wedge$$

$$n_{m-1}(dr_{M_0-m} + dr_{M_0-m+1}) - j(-1) \wedge n_{m-1}(di_{M_0-m} + di_{M_0-m+1})$$

⋮

Pass M for complex Walsh codes $\hat{Z}^{(M)}(d_{M-1} \ldots d_1 d_0) =$ $$\sum_{n_{M_0-1}=0,1} \hat{Z}^{(M-1)}(d_{M-1} \ldots d_{M-m-1}n_{M_0-1}d_{M_1-1} \ldots d_0) \cdot [$$

$$(-1) \wedge n_{M_0-1}(dr_0 + dr_1) - j(-1) \wedge n_{M_0-1}(di_0 + di_1) =$$

$$\hat{Z}(d_{M-1}d_{M-2} \ldots d_1 d_0)$$

An additional re-ordering pass is added to change the decoded N chip block $\hat{Z}$ $(d_{m-1}d_{m-2} \ldots d_0)$ in bit reversed ordering to the normal readout ordering. In this representative fast implementation the scaling factor N has been removed in the re-ordering pass whereas a typical implementation will re-scale each pass. The output of this final pass is the receiver estimate of the transmitted data symbol vector $\hat{Z}(d_0 d_2 \ldots d_{M-1}) = \hat{Z}(d)$ The fast decoding algorithms 55a, 55b perform the inverse of the signal processing for the encoding 41, 51 in equations (3), (6) of the complex, generalized complex Walsh respectively, to recover estimates $\{\hat{Z}(d)\}$ of the transmitter user data symbols $\{Z(d)\}$. These algorithms are computationally efficient means to implement the decoding of each N chip code block for multiple data rate users whose lowest data rate corresponds to the data symbol rate of an N chip encoded user. For the fast Walsh decoding algorithm in 55a the number of required real additions $R_A$ per data symbol is approximately equal to $R_A \approx 2M+2$ which is identical to the complexity metric for the fast encoding algorithm. For the fast generalized complex Walsh decoding algorithm in 55b the computational complexity is $R_A \approx 2M + M_1 + 2$ real additions per data symbol and $R_M \approx 2M_1$ real multiplies per data symbol which is identical to the complexity metric for the fast encoding algorithm.

For the complex Walsh decoding the fast algorithm 55a implements M signal processing passes on the N chip block of received data chips after de-scrambling, followed by a re-ordering pass of the receiver recovered estimates of the data symbols. Passes m=1, 2, ..., M implement 2^m chip decoding. For the generalized complex Walsh the fast algorithm 55b combines the complex Walsh algorithm with a DFT algorithm in M signal processing passes where $M = M_0 + M_1$ with $M_0$, $M_1$ respectively designating the complex Walsh, DFT decoding passes. Passes m=1, ..., $M_1$ implement the complex DFT decoding and the remaining passes $M_1+1$, ..., M−1 implement decoding with the complex Walsh codes, and the last pass M completes the complex decoding.

FIG. 5 hybrid and generalized hybrid Walsh CDMA encoding is a representative implementation which replaces the current real Walsh encoding 13 in FIG. 1, and is defined in equations (3) and (6). The input user data symbols $\{Z(u_{m,k_m})\}$ 56 are mapped into the data symbol vector 57 Z(d) as described in equations (3). Data symbols $\{Z(d)\}$ are encoded and summed over the user data symbols in 58 and 59 by the fast encoding algorithm in equations 41 in (3) for the hybrid Walsh and in equations 51 in (6) for the generalized hybrid Walsh. For the generalized hybrid Walsh, the fast DFT encoding 59 follows the fast complex Walsh encoding 58. This encoding and summing over the user data symbols is followed by PN encoding with the scrambling sequence $[P_R(n)+jP_I(n)]$ 60. Output is the stream of complex CDMA encoded chips $\{Z(n)\}$ 61.

It should be obvious to anyone skilled in the communications art that this example implementation in FIG. 5 clearly defines the fundamental CDMA signal processing relevant to this invention disclosure and it is obvious that this example is representative of the other possible signal processing approaches.

FIG. 6 hybrid and generalized hybrid Walsh CDMA decoding is a representative implementation which replaces the current real Walsh decoding 27 in FIG. 3 and is defined in equations (7). Inputs are the received estimates of the complex CDMA encoded chips $\{\hat{Z}(n)\}$ 62. The PN scrambling code is stripped off from these chips 63 by changing the sign of each chip according to the numerical sign of the real and imaginary components of the complex conjugate of the PN code as per the decoding algorithms 54 in equations (7). The hybrid and generalized hybrid Walsh channelization coding is removed by the fast decoding algorithms in equations 55 in (7) to recover the receiver estimates $\{\hat{Z}(d)\}$ of the transmitted data symbols $\{Z(d)\}$. The complex DFT fast decoding 64 is followed by the Walsh fast decoding 65 for the generalized hybrid Walsh. Decoded outputs are the estimated data vector $\hat{Z}(d)$ 66 whose entries are read out as the set of receiver estimates $\{\hat{Z}(u_{m,k_m})\}$ 67 of the transmitted data symbols.

It should be obvious to anyone skilled in the communications art that this example implementation in FIG. 6 clearly defines the fundamental CDMA signal processing relevant to this invention disclosure and it is obvious that this example is representative of the other possible signal processing approaches.

Preferred embodiments in the previous description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the wider scope consistent with the principles and novel features disclosed herein.

It should be obvious to anyone skilled in the communications art that this example implementation of the hybrid Walsh and generalized hybrid Walsh for multiple data rate users in equations (3), ..., (7) clearly defines the fundamental CDMA signal processing relevant to this invention disclosure and it is obvious that this example is representative of the other possible signal processing approaches. For example, the Kronecker matrices $E_N$ and $H_N$ can be replaced by a plurality of codes and the Kronecker construction can be replaced by direct sum construction and by functionals and the resultant codes can be quasi-orthogonal.

For cellular applications the transmitter description is representative of the transmission signal processing applicable to this invention for both the hub and user terminals, and the receiver description is representative of the corresponding receiving signal processing for the hub and user terminals for applicability to this invention.

For optical communications applications the microwave processing at the front end of both the transmitter and the receiver is replaced by the optical processing which performs the complex modulation for the optical laser transmission in the transmitter and which performs the optical laser receiving function of the microwave processing to recover the complex baseband received signal.

What is claimed is:

1. A method for generating and applying N hybrid Walsh complex orthogonal codes for code division multiple access (CDMA), said method comprising the steps:

generating N Walsh codes W(c) with code index c=0, 1, 2, ..., N−1, each with N chips where N is a power of 2, generating said N hybrid Walsh codes $\tilde{W}$ (c) by reordering each of said N Walsh codes into a corresponding real component and a corresponding imaginary component of a hybrid Walsh code as defined by equations for $c = 0$, $\tilde{W}(c) = W(0) + jW(0)$ for $c = 1, 2, ..., N/2 - 1$, $\tilde{W}(c) = W(2c) + jW(2c - 1)$ for $c = N/2$, $\tilde{W}(c) = W(N - 1) + jW(N - 1))$ for $c = N/2 + 1, ..., N - 1$, $\tilde{W}(c) = W(2N - 2c - 1) + jW(2N - 2c)$ wherein $j = \sqrt{-1}$, wherein said N hybrid Walsh codes are generated by reading the N Walsh codes chip values from a Walsh code memory in a digital signal processor and writing the reordered Walsh codes to a hybrid Walsh code memory, applying said N hybrid Walsh codes in an encoder and in a decoder of a CDMA system by encoding transmitting data and decoding receiving data with said N hybrid Walsh complex codes, and transmitting data encoded by the encoder and receiving data decoded by the decoder.

2. A method for generating and applying spreading codes for code division multiple access (CDMA), comprising the steps:

constructing a P by P Discrete Fourier Transform (DFT) code matrix E having row vectors and column elements wherein said row vectors are code vectors, said column elements are code elements, and P is an integer, constructing a hybrid Walsh code having row vectors and column elements wherein row vectors are code vectors and column elements are code elements, said hybrid Walsh code is defined by a N row by N column code matrix $\tilde{W}$ where N is a power of 2, constructing a spreading code matrix C by a Kronecker product of said hybrid Walsh code matrix $\tilde{W}$ with said DFT code matrix E defined by the equation $C = \tilde{W} \hat{x} E$ wherein the operator $\hat{x}$ is a Kronecker product operation and said spreading code is defined by an N*P row by N*P column code matrix, applying said spreading code matrix C in an encoder and in a decoder of a CDMA system by encoding data and decoding data with said spreading code matrix C, and transmitting data encoded by the encoder and receiving data decoded by the decoder.

3. A method for implementing hybrid Walsh codes for code division multiple access (CDMA), comprising the steps:

encoding N data symbols contained in a block with respective N hybrid Walsh codes to yield N encoded data symbols for each block at the output chip rate of 1/T chips per second wherein T is the interval between chips and N is s power of 2, wherein said encoder accepts up to N users per block and M is an actual number of users represented in the block, each of said users having a data rate corresponding to one of 1, 2, ..., N/2 data symbols per block, wherein said encoder accepts packets from each user and writes them to memory "A" for each block, wherein a binary address index comprising a number of bits corresponding to the maximum number of users N is used for addressing said data symbols stored in memory "A" and the data symbols for each user of the block are stored in memory "A" in a hierarchy such that a particular user is selected according to a number of more significant bits of the binary address index and the data symbols of the particular user are selected according to a number of lesser significant bits of the binary address index, the number of more significant bits and lesser significant bits of the particular user being determined according to the data rate of the particular user and the total number of users M per block.

4. Wherein said encoder in claim 1 implements a fast encoding implementation algorithm, comprising the steps:

wherein said fast encoding algorithm implemented in said encoder uses memory "A" for input and to support pass 1 and uses memories "B" and "C" to support passes 2, ..., M wherein N=2^M and M is an integer and uses memory "D" to store the encoded chip output from a reordering pass, writing input data symbol vector Z to said memory "A" at binary addressing word values $d_0, d_1, ..., d_{M-2}, d_{M-1}$, on pass m=1, reading pairs of data symbols from "A" and performing a two-point hybrid Walsh transform on two data symbols in each pair specified by a binary data addresses $d_{M-1}$ and writing the output to "B" at a reordered $d_{M-1}$ binary data address, on pass m=2, reading pairs of data symbols from "B" and performing a two-point hybrid Walsh transform on two data symbols in each pair specified by a binary data addresses $d_{M-2}$ and writing the output to "C" at a reordered $d_{M-2}$ binary data address, on pass m=3, reading pairs of data symbols from "C" and performing a two-point hybrid Walsh transform on two data symbols in each pair specified by a binary address $d_{M-3}$ and writing the output to "B" at a reordered $d_{M-3}$ binary data address, continuing passes m=4, . . . , M−1, M using memories "B" and "C" and data binary addresses $d_{M-4}$ through $d_0$, writing the output of pass m=M in an encoded chip vector Z stored in bit-reversed order, performing a final reordering pass to reorder the encoded chip vector Z and store the reordered chip vector Z in memory "D", and wherein said encoder reads said encoded chip vector Z in "D" and overlays said encoded chip vector with long and short pseudo-noise (PN) codes to generate chips for transmission.

5. Wherein said decoder in claim 1 implements a fast decoding implementation algorithm, comprising the steps:

wherein said fast decoding algorithm implemented in said decoder uses memory "A" for input and to support pass 1 and uses memories "B" and "C" to support passes 2, . . . , M wherein N=2^M and M is an integer and uses memory "D" to store the decoded chip output from a reordering pass, removing pseudo-noise (PN) codes from a received encoded chip vector and writing the resultant encoded chip vector Z to said memory "A" at binary addressing word values $n_0, n_1, \ldots, n_{M-2}, n_{M-1}$, wherein on pass m=1, reading pairs of chip symbols from "A" and performing a two-point hybrid Walsh inverse transform on two chip symbols in each pair specified by a binary chip addresses $n_0$ and writing the output to "B" at a reordered $n_0$ binary data address, on pass m=2, reading pairs of chip symbols from "B" and performing a two-point hybrid Walsh inverse transform on two chip symbols in each pair specified by a binary chip addresses $n_1$ and writing the output to "C" at a reordered $n_1$ binary data address, on pass m=3 reading pairs of chip symbols from "C" and performing a two-point hybrid Walsh inverse transform on two chip symbols in each pair specified by a binary address $n_2$ and writing the output to "B" at a reordered $n_2$ binary data address, continuing passes m=4, . . . , M−1, M using memories "B" and "C" and data binary addresses $n_3$ through $n_M$, writing the output of pass m=M in a decoded data symbol vector Z stored in bit-reversed order, performing a final scaling pass that scales the decoded data symbol vector Z by a hybrid Walsh inverse transform scaling factor, reorders the scaled data symbol vector, and stores the reordered data symbol vector as output vector Z in memory "D", and wherein said decoder reads said output vector in "D" for further processing to recover information.

* * * * *